United States Patent
Patel et al.

(10) Patent No.: US 9,292,082 B1
(45) Date of Patent: Mar. 22, 2016

(54) TEXT-ENTRY FOR A COMPUTING DEVICE

(75) Inventors: Nirmal Patel, Mountain View, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1146 days.

(21) Appl. No.: 13/291,636

(22) Filed: Nov. 8, 2011

(51) Int. Cl.
  *G09G 5/00* (2006.01)
  *G06F 3/01* (2006.01)
  *G02B 27/01* (2006.01)

(52) U.S. Cl.
  CPC .............. *G06F 3/011* (2013.01); *G02B 27/01* (2013.01)

(58) Field of Classification Search
  CPC ........... G06F 3/01; G06F 3/011; G06F 3/013; G06F 3/017; G06F 3/03; G06F 3/041; G06F 3/0412; G06F 3/048; G06F 3/0481; G06F 3/04812; G06F 3/0482; G06F 3/0484; G06F 3/04842; G06F 3/0485; G06F 3/0487; G06F 3/0488; G06F 3/03547; G02B 27/01; G02B 2027/0141; G02B 27/017; G02B 27/0176; G02B 27/0178; G02B 27/0179
  USPC ............................................................. 345/8
  See application file for complete search history.

(56) References Cited

U.S. PATENT DOCUMENTS

| 7,251,367 | B2 | 7/2007 | Zhai |
| 7,312,981 | B2 | 12/2007 | Carroll |
| 7,461,355 | B2 | 12/2008 | SanGiovanni |
| 7,719,521 | B2 | 5/2010 | Yang et al. |
| 7,958,457 | B1 | 6/2011 | Brandenberg et al. |
| 2006/0012566 | A1 | 1/2006 | Siddeeq |
| 2008/0165142 | A1* | 7/2008 | Kocienda et al. ............. 345/173 |
| 2010/0079356 | A1* | 4/2010 | Hoellwarth ....................... 345/8 |

OTHER PUBLICATIONS

Cakmakci, O., et al., "Head-Word Displays: A Review," Journal of Display Technology, vol. 2, pp. 199-216, 2006.
Unpublished U.S. Appl. No. 13/160,688, filed Jun. 15, 2011, with inventors Nirmal Patel and Thad Starner, entitled "Rotary Wheel User Interface for a Computing Device".

* cited by examiner

*Primary Examiner* — Gustavo Polo
(74) *Attorney, Agent, or Firm* — McDonnell Boehnen Hulbert & Berghoff LLP

(57) ABSTRACT

Example method and systems for text-entry are disclosed. A method may involve displaying a user interface comprising a character line, the character line comprising a plurality of characters in a substantially linear arrangement. The method may then involve receiving a first input via a touch-sensitive input device, wherein the first input comprises a detected movement on a first portion of the touch-sensitive input device. Further, the method may involve, in response to receiving the first input, displaying an indication of a selected character. The method may then involve receiving a second input via the touch-sensitive input device, wherein the second input comprises a detected movement from the first portion to a second portion of the touch-sensitive input device and back to the first portion. The method may then involve displaying the selected character in a text-entry area of the user interface that is separate from the character line.

20 Claims, 15 Drawing Sheets

TEXT-ENTRY FOR A COMPUTING DEVICE

BACKGROUND

Unless otherwise indicated herein, the materials described in this section are not prior art to the claims in this application and are not admitted to be prior art by inclusion in this section.

Various technologies can be utilized to display information to a user of a computing system. Some systems for displaying information may utilize a screen (such as a liquid crystal display (LCD) screen or plasma display screen) integrated into a portable device such as a mobile phone or audio playback device that can be moved, on demand, into a position by a user at which the screen is viewable. Other systems for displaying information continuously to a user may utilize "heads-up" displays.

A heads-up display can be incorporated into a pair of goggles, glasses, a headband, a helmet, or other such device that the user can wear. A heads-up display is typically positioned near the user's eyes and calibrated and/or aligned to the user's field of view to allow the user to review displayed information with little or no head movement. The display may also be transparent or translucent, allowing the user to view and interact with the surrounding environment while wearing the heads-up display. In some cases, the display may not be transparent, but may project a captured image of the environment on the display to simulate transparency or translucency. In other cases, the display may be formed directly on a user's retina via a low-powered laser scanning technique. To generate display information such as images and text for display, a computer processing system may be used. Such heads-up displays have a variety of applications, such as aviation information systems, vehicle navigation systems, information display/interaction, social networking, and video games, among others.

For example, in aviation information systems, display information may include airspeed, altitude, a horizon line, heading, turn/bank, and slip/skid indicators. Display information may also include aviation data and symbols for use in approaches and landings. For example, a flight guidance system in the heads-up display can provide visual cues based on navigation aids such as an Instrument Landing System or augmented Global Positioning System. Other aviation uses are possible as well. In the automotive field, display information may include speedometer, tachometer, and navigation system displays. Additionally, night vision information may be displayed to aid in night driving. Other automotive uses are possible as well.

As more and more applications and uses are being developed for heads-up display devices, and computing systems in general, more complex interactions have arisen. For example, in the aviation context, a pilot may need to interface with the information being displayed in the heads-up display, perhaps to switch between a parameter display interface (e.g., displaying airspeed, altitude, a horizon line, heading, etc.) and an approach/landing display interface.

Other, more complex interactions may also be necessary. For example, a pilot may wish to interact with other pilots in the sky and/or send information to one or more selected pilots, or a driver may wish to interact with other drives on the road or other passengers in the car. Current solutions, such as buttons, are limited in their functionality, and generally increase bulk, block light, and/or reduce peripheral vision due to their size, location, and composition requirements.

Furthermore, current computing systems and heads-up displays lack the provision of advanced text entry input interfaces that allow for complex text entry input operations.

SUMMARY

Disclosed herein are improved methods and devices for controlling and interfacing with a computing system such as a wearable heads-up display, and specifically for providing an easier and more efficient method of text entry.

In one embodiment, a user interface including a rotary wheel is displayed on a display, the rotary wheel having a plurality of character lines, each character line including a plurality of characters in a substantially linear arrangement. The rotary wheel is rotatable to allow for selection of a given one of the character lines. In response to receiving a first input, via an input device, the rotary wheel is caused to rotate to a particular one of the character lines. In response to receiving a second input, via the input device, a particular one of the characters in the particular one of the character lines is located. In response to receiving a third input, via the input device, the particular one of the characters in the particular one of the character lines is selected. As a result of being selected, the particular one of the characters is caused to be displayed on an area of the display separate from the user interface.

The input device may be a touch-sensitive surface input device, and each of the first, second, and third inputs may be detected via the touch-sensitive surface input device. For example, the first input may correspond to a detected movement in a first planar direction across the touch-sensitive surface input device, the second input may correspond to a detected movement in a second planar direction across the touch-sensitive surface input device different from the first, and the third input may correspond to a detected movement in one of (i) a perpendicular direction away from the touch-sensitive surface and (ii) a third planar direction across the touch-sensitive surface input device. In an embodiment in which the third input corresponds to the movement in the third planar direction across the touch-sensitive surface, it may be differentiated from the first and/or second inputs based on a detected velocity of the third input being above a threshold value.

In one embodiment, the touch-sensitive input device is a touchscreen device that functions as the display and the user interface. In another embodiment, the touch sensitive input device may be disposed separately from the display. For example, the touch-sensitive input device may be disposed on a side of a wearable heads-up display, and the display coupled to the wearable heads-up display at a location so as to be within a field of view of a wearer. In one specific embodiment, the wearable heads-up display may be a pair of glasses, and the touch-sensitive input device separately disposed on a side of a stem of the pair of glasses.

In a further embodiment, the third input may comprise a detected planar direction movement across the touch-sensitive surface associated with a shift command. Responsive to receiving the third input, one or more characters in the particular character line may be augmented prior to being displayed. The augmentation may include one of a (i) capitalized version of the selected character, (ii) lower-case version of the selected character, and (iii) a symbol associated with the selected character.

In still another embodiment, a fourth input may be received via the touch-sensitive surface input device comprising a detected touch of the touch-sensitive surface lasting below a threshold period of time. A detected touch lasting below the threshold period of time may be associated with a white-space character input command, and as a result, a white-space character may be displayed in the area of the display separate from the user interface. The threshold period of time may be, for example, less than 250 ms.

In another embodiment, a fourth input may be received via the touch-sensitive surface input device comprising a detected swipe, in a first particular planar direction, across the touch-sensitive surface at a detected velocity greater than a minimum threshold value. Such a swipe may be associated with a backspace input command, and as a result, a character previously displayed on the display may be removed from the display.

In yet another embodiment, a fourth input may be received, via the touch-sensitive surface input device, while receiving the second input, comprised of a detected dwell time of a touch on the touch-sensitive surface lasting more than a threshold period of time. Such a dwell time touch may be associated with a particular currently-located one of the characters in the particular one of the character lines. In response, previously un-displayed variations of the particular one of the characters may be displayed for selection via the third input. The variations may include, for example, one or more of accented versions, capitalized versions, lower-case versions, and associated symbols of the particular currently-located one of the characters. The threshold period of time may be, for example, greater than 250 ms and less than 2 s.

The first input may comprise, for example, a detected rotate gesture that causes the rotary wheel to rotate in the direction that is substantially perpendicular to the linear arrangement of the characters in the character lines and a subsequent stop-gesture that ends rotation of the rotary wheel at the particular one of the character lines. The second input may comprise, for example, a detected location gesture that causes particular ones of the characters in the particular one of the character lines to be visually augmented to provide an indication of a currently located character that would be selected if a third input (a selection gesture) were immediately subsequently received. For example, the characters may be augmented by one or more of a foreground or background highlighting function, a color-change function, a character size increase function, and a character-border size increase function. The third input may comprise, for example, a detected character selection gesture that selects one of the currently located (and visually augmented) characters.

In an additional or alternative embodiment, the input device may be a mechanical input device such as a scroll-wheel input device. The first, second, and third inputs may correspond to one of a tilt, a depression, and a rotation of the scroll-wheel input device. For example, the first input may correspond to a detected tilt in a first planar direction of the scroll-wheel input device. The second input may correspond to a detected rotation of the scroll-wheel input device in a second planar direction different from the first. And the third input may correspond to a depression of the scroll-wheel input device. Other functions may be similarly executed using the scroll-wheel input in a manner substantially similar to that set forth above with respect to the touch-sensitive input device. In another additional or alternative embodiment, the input device may be a scanning imaging device operable in a manner similar to that set forth above with respect to the touch sensitive surface input device, with the exception that a reference object need not have a grounding electrical characteristic to operate the scanning imaging device.

In another aspect, an example method involves: (i) displaying a user interface comprising a character line, the character line comprising a plurality of characters in a substantially linear arrangement; (ii) receiving a first input via a touch-sensitive input device, wherein the first input comprises a detected movement on a first portion of the touch-sensitive input device; (iii) in response to receiving the first input, displaying an indication of a selected character in the character line; (iv) receiving a second input via the touch-sensitive input device, wherein the second input comprises a detected movement from the first portion to a second portion of the touch-sensitive input device and back to the first portion; and (v) in response to receiving the second input, displaying the selected character in a text-entry area of the user interface that is separate from the character line.

In yet another aspect, a non-transitory computer readable medium having instructions stored thereon that, in response to execution by a processor, cause the processor to perform operations is disclosed. According to an example embodiment, the instructions include: (i) instructions for displaying a user interface comprising a character line, the character line comprising a plurality of characters in a substantially linear arrangement; (ii) instructions for receiving a first input via a touch-sensitive input device, wherein the first input comprises a detected movement on a first portion of the touch-sensitive input device; (iii) instructions for, in response to receiving the first input, displaying an indication of a selected character in the character line; (iv) instructions for receiving a second input via the touch-sensitive input device, wherein the second input comprises a detected movement from the first portion to a second portion of the touch-sensitive input device and back to the first portion; and (v) instructions for, in response to receiving the second input, displaying the selected character in a text-entry area of the user interface that is separate from the character line.

In still yet another aspect, a wearable computing system is disclosed. An example wearable computing system includes: (i) a head-mounted display, wherein the head-mounted display is configured to provide a view of a real-world environment of the wearable computing system, wherein providing the view of the real-world environment comprises displaying computer-generated information and allowing visual perception of the real-world environment; (ii) a display system, wherein the display system is configured to display a user interface comprising a character line, the character line comprising a plurality of characters in a substantially linear arrangement; and (iii) a touch-sensitive input device, wherein the touch-sensitive input device is configured to receive a first input via a touch-sensitive input device, wherein the first input comprises a detected movement on a first portion of the touch-sensitive input device. The display system is further configured to, in response to receiving the first input, display an indication of a selected character in the character line. Further, the touch-sensitive input device is further configured to receive a second input via the touch-sensitive input device, wherein the second input comprises a detected movement from the first portion to a second portion of the touch-sensitive input device and back to the first portion. Still further, the display system is further configured to, in response to receiving the second input, display the selected character in a text-entry area of the user interface that is separate from the character line.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods and systems disclosed herein generally relate to input devices and user interfaces for computing systems such as wearable heads-up displays, and methods of entering text using such input devices and interfaces. First, examples of wearable heads-up display computing systems will be discussed, followed subsequently by discussions of input devices and user interfaces for entering text via computing systems such as wearable heads-up displays.

1. Wearable Heads-Up Display Computing System

Figure 1:
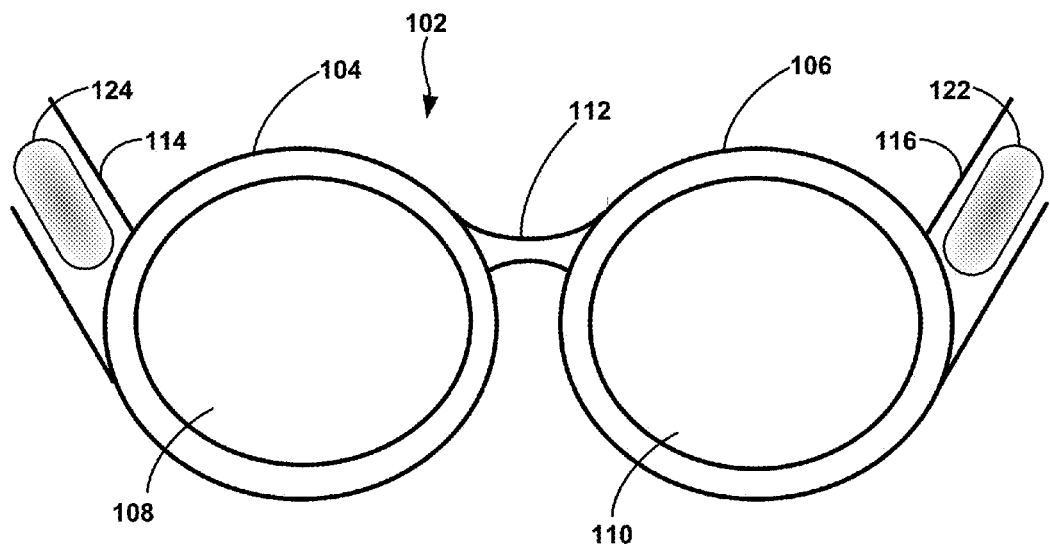
FIG. 1 shows an example embodiment of a wearable heads-up display with an integrated input device.

FIG. 1 shows an example embodiment of a wearable heads-up display computing system suitable for continuous, daily use as a wearable personal electronics device. While FIG. 1 illustrates glasses 102 as an example of a wearable heads-up display computing system, other types of wearable heads-up displays could additionally or alternatively be used. In addition, the disclosed text entry method could also be applied to other computing systems, other wearable electronic devices (such as a wrist watch), or other non-wearable electronic devices, such as a mobile phone or laptop computer.

As illustrated in FIG. 1, glasses 102 comprise frame elements including lens-frames 104, 106, respective lens elements 108 and 110, center frame support 112, two stems 114 and 116, and planar direction input devices 122, 124. The center support 112 and the two rear-ward extending stems 114 and 116 are configured to secure the glasses 102 to a user's face via a user's nose and ears, respectively. Each of the frame elements 104, 106, 112 and stems 114, 116 may be formed of a solid structure of plastic, metal, ceramic, etc., or may be formed of a hollow structure of similar material so as to allow wiring and component interconnects to be internally routed through the glasses 102. Each of stems 114 and 116 is an example of a projection that extends away from a display element and is used to secure the display element to a user. The projection may be formed of a rigid or semi-rigid material such as plastic or metal, but may also be formed of other materials, including, for example, elastic or rubber. In addition to securing the display element to a user's ear(s), the projection may additionally or alternatively secure the display element to the user by extending around a rear portion of the user's head, and/or by connecting to a head-mounted helmet structure. Other possibilities exist as well.

Figure 2:
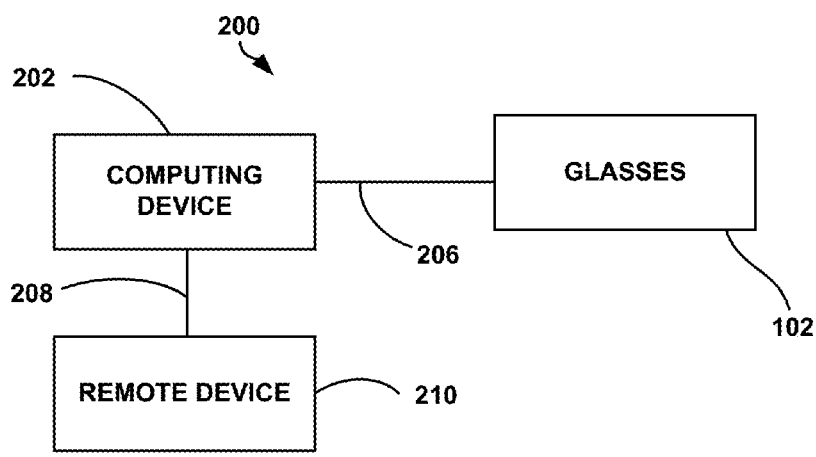
FIG. 2 shows a block diagram of an example embodiment of a wearable heads-up display system.

FIG. 2 shows an example embodiment of a wearable heads-up display computing system. As shown in FIG. 2, a wearable heads-up display computing system 200 may include glasses 102 coupled to a computing device 202 via a connection 206. The structure of computing device 202 will be described in more detail with respect to FIG. 9. In one embodiment, the computing device 202 may be incorporated into the glasses 102. In another embodiment, the computing device 202 may be a head-mounted computing device incorporated into, for example, a hat or helmet, or may be a body-mounted computing device incorporated into, for example, a waist-mounted mobile phone or personal digital assistant. The connection 206 may be a wired and/or wireless link. A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities. The connection 206 may function to transmit data and/or commands to and/or from the glasses 102, to transmit input received from planar direction input devices 122, 124, and/or to transmit display data for display on respective lenses 108 and/or 110.

Figure 3:
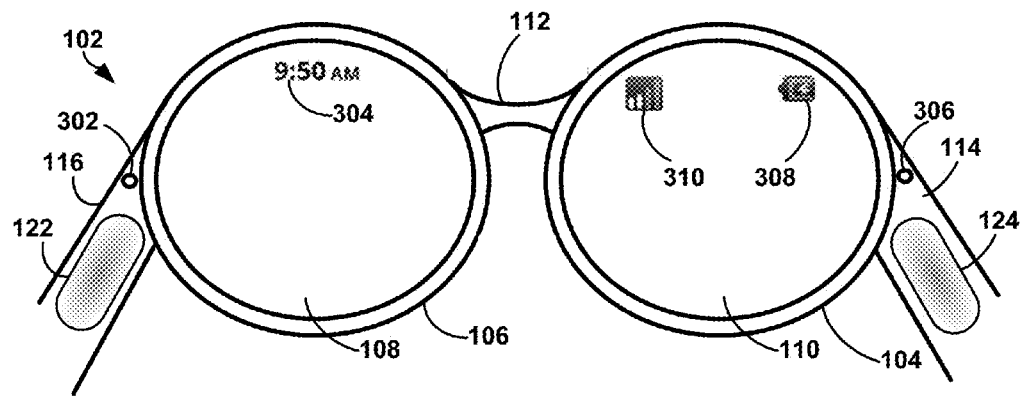
FIG. 3 shows an example embodiment of a wearable heads-up display device including display elements.

FIG. 3 shows an example embodiment of a wearable heads-up display device including display elements. As shown in FIG. 3, the lenses 108 and 110 may act as display elements. Glasses 102 may include a miniature projector 302 coupled to an inside-surface of stem 116 and configured to project a display onto an inside-surface of lens 108. For example, the projected display may include a current time 304. Additionally or alternatively, a second projector 306 may be coupled to an inside-surface of stem 114 and may be configured to project a display onto an inside-surface of lens 110. For example, the projected display may include a current battery-level 308 associated with the system 200. Additionally, a signal strength indicator 310 may provide a user with an indication of a signal strength associated with a wireless connection (such as connection 208 with remote device 210). While indicator 310 is illustrated as providing a plurality of signal strength bars, other types of signal strength displays could be used, such as a numeric text, a line-graph, etc.

In FIG. 3, the lenses 108 and 110 act as a combiner in a light projection system, and may include a coating that reflects the light projected onto them from the projectors 302, 306. In some embodiments, the coating may not be omitted (e.g., when the projectors 302, 306 are scanning laser devices that interact directly with the user's retinas). Of course, other types of display elements could also be used. For example, the lens 108, 110 themselves may include a transparent or semi-transparent matrix display such as an electroluminescent (EL) display or liquid crystal display (LCD). A corresponding display driver may be disposed within the lens frames 104, 106 for driving such a matrix display. Alternatively or additionally, a laser or LED source and scanning system could be used to draw a raster display directly onto the retina of one or more of the user's eyes. Other possibilities exist as well.

Returning to FIG. 2, the computing device 202 may also communicate with a remote device 210 via a connection 208. Connection 208 may be a wired and/or wireless link, such as described above in relation to connection 206. The remote device 210 may be a device associated with the wearable heads-up display system 200 (or a user thereof, not shown), and may be a mobile phone, a personal data assistant (PDA), or some other device. For example, the remote device 210 may be a mobile phone having Bluetooth capabilities, and may provide information for display on respective lenses 108 and/or 110, or may provide a target for transmission of data or instructions responsive to input operations received via planar direction input devices 122, 124. The connection 208 may comprise one or more base stations, routers, switches, LANs, WLANs, WANs, access points, or other network infrastructure. For example, remote device 210 may be accessible via the Internet, and may comprise a computing cluster associated with a particular web service (e.g., social-networking, photo sharing, address book, etc.).

Figure 4A:
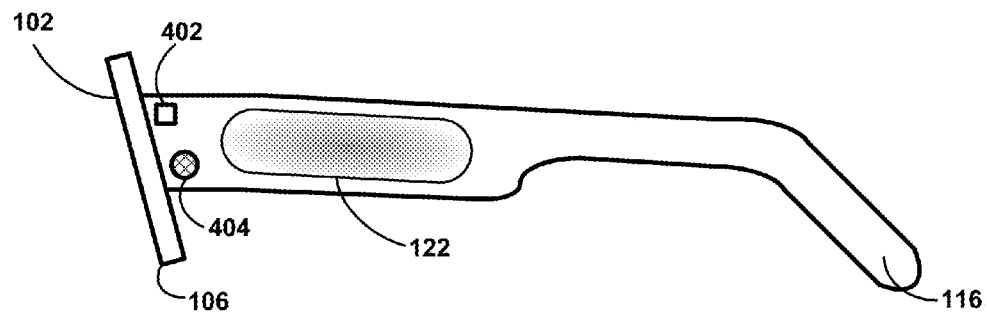
FIG. 4a shows an example configuration of various input interfaces for a wearable heads-up display device, including a single integrated planar direction input device.

FIGS. 4a-e show various example embodiments of input devices for glasses 102 that allow a user to interact with the glasses 102 and computing device 202, and to enter text via a rotary wheel user interface displayed on one or more of the lenses 108, 110. As set forth in FIG. 4a, an input device may comprise one or more of a planar direction input device 122, a movement sensor 402, and a microphone 404, among other possible input elements. While FIG. 4a illustrates a side-view of stem 116, additional and similar input interfaces may be provided on stem 114. For example, and as illustrated in FIG. 3, an additional planar direction input device 124 may be provided on stem 114.

Returning to FIG. 4a, the planar direction input device 122 may sense at least one of a position and movement of a reference object along a planar direction relative to a surface of the planar direction input device 122 (e.g., parallel to the surface of FIG. 4a). In an example, the planar direction input device 122 may be a touch-sensitive surface configured to sense, via capacitive sensing, resistance sensing, and/or via a surface acoustic wave (SAW) process, among other possibilities, a position and movement of a user's finger, hand, palm, or other grounding mechanism along a planar direction relative to a surface of the touch-sensitive surface. Additionally, the planar direction input device 122 may be capable of sensing movement of a finger, palm, hand, or other grounding mechanism in a direction normal to the surface of the planar direction input device 122 (e.g., into the surface of FIG. 4a), including sensing a level of pressure applied to the planar direction input device 122. In at least one embodiment, the planar direction input device 122 may also act as a binary or analog button, and provide additional input to glasses 102 when depressed.

In a capacitive touch-sensitive surface, one or more insulating layers are coated with one or more conducting layers, and a driving signal applied to at least one of the one or more conducting layers. As a user's body acts as a conductor, such that touching the surface with one's finger (e.g., or palm, hand, or other body part) causes a distortion in at least one of the conducting layer's electrostatic field, measurable as a change in capacitance. Different capacitive technologies may be used to determine the location of the touch. For example, in a surface capacitance method, only one side of an insulating layer is coated with a conductive layer. A small voltage is then applied to the conductive layer, resulting in an electrostatic field. When a user's finger touches the surface, the capacitance of the system is changed, and a controller can determine the location of the touch indirectly from the change in capacitance.

Alternatively, in a mutual capacitance method, vertically and horizontally-arranged driving lines (e.g., two conductive layers) are formed separated by an insulating layer. Bringing a finger close to the surface of the array changes the local electrostatic field around an intersection of the separated driving lines, changing the mutual capacitance between driving lines at corresponding intersecting areas. Because the capacitance change can be measured simultaneously at each intersecting point of the driving lines, mutual capacitance can be used to determine touch locations at a plurality of locations (e.g., multi-touch). Of course, in addition to a finger, other objects that provide the required change in electrostatic field could also be used, including a knuckle, hand, multiple fingers, stylus, or other reference object.

In a resistive touch-sensitive surface, two electrically conductive layers having horizontal and vertical lines are formed separated by an insulating gap (e.g., glass, plastic, air, etc.), and a voltage gradient is applied to the first conductive layer. When contact is made with the surface, the two conductive layers are pressed together, and the second sheet measures the voltage as distance along the first sheet, providing an X coordinate. After the X contact coordinate has been acquired, a second voltage gradient is applied to the second sheet to ascertain the Y coordinate. These two operations provide the touch location that contact was made.

In a SAW touch-sensitive surface, conductive layers are not disposed throughout the planar direction input device 122 itself. Rather, transmitting and receiving transducers and reflectors are disposed at edges of the planar direction input device. Waves emitted by the transmitting transducers are reflected across the touch-sensitive surface in the X and Y directions and to receiving transducers via the reflectors. When a finger (or other similar reference object, as set forth earlier) touches the surface, portions of the waves are absorbed, causing a touch event and its corresponding location to be detected by control circuitry.

While several particular types of touch-sensitive surfaces are discussed here, other types of touch-sensitive surface devices could also be used.

As illustrated in FIG. 4a, a width of the stem 116 may be formed thicker in a region in which the planar direction input device 122 is formed, and thinner in a region in which the planar direction input device 122 is not formed, so as to accommodate sufficient space to detect input movements (such as finger movements) in all planar directions (e.g., 360°), or at the very least, in at least two pairs of diametrically opposed directions such as up, down, forward, and back.

Because the expanded width of the stem 116 in the region of the planar direction input device 122 may impede the peripheral vision of the user's eyes and/or may block the entrance of light, the stem 116 and/or the planar direction input device 122 may be formed of a translucent or substantially transparent material. For example, the stem 116 may be formed of a translucent or substantially transparent plastic material such as Acrylic (polymethlamethacrylate), Butyrate (cellulose acetate butyrate), Lexan (polycarbonate), and PETG (glycol modified polyethylene terphthalate). Other types of plastics could also be used. Translucent or substantially transparent materials other than plastic could additionally or alternatively be used, such as a tempered glass.

The planar direction input device 122 may be formed of one or more translucent or transparent insulating (e.g., glass or plastic) layers and one or more translucent or transparent conducting (e.g., metal) layers. The glass may be tempered or toughened glass manufactured through a process of extreme heating and rapid cooling. The plastic may be a polyimide, polyethylene, or polyester based plastic film. Other types of translucent and/or substantially transparent glasses and plastics could also be used. The conducting layer may be formed of a metal oxide, such as indium tin oxide (ITO), aluminum zinc oxide (AZO), or gallium zinc oxide (GZO). In one embodiment, carbon nanotube based conducting layers could be used. Other types of insulating and conducting layers could also be used.

Edges of the planar direction input device 122 may be formed to have a raised, indented, or roughened surface, so as to provide tactile feedback to a user when the user's finger (or other body part) reaches the edge of the planar direction input device 122. Such a structure may also allow a user (who has limited or no visual cues as to the location of the planar direction input device 122) to locate the planar direction input device 122 on the stem 116 quickly, similar to the way in which physical indentions that may be provided on the "F" and "J" keys of a keyboard allow a typist to quickly position his or her fingers correctly on the keyboard. Of course, the raised, indented, and/or roughened surface could alternatively or additionally be formed in the stem 116 just past the edge of the planar direction input device 122. A similar roughened, raised, or indented element may be provided at substantially a center of the planar direction input device 122 to provide additional tactile cues to a user.

Although planar direction input devices 122 and 124 are illustrated in the figures as being disposed on stems 114 and/or 116, in some embodiments, planar direction input device 122 and/or planar direction input device 124 may be disposed at other locations on glasses 102, including for example, lens-frames 104, 106, lens elements 108, 110, or center frame support 112, among other possibilities.

Movement sensor 402 may be provided on or in a frame element of the glasses 102, and may act as an input device configured to track a user's movements. The movement sensor 402 may include one or more of an accelerometer, a magnetometer, or a gyroscope, among other options. An accelerometer is a device that measures acceleration. Single- and multi-axis models can detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, and resonant solids to measure orientation. Other types of gyroscopes could be used as well. A magnetometer is a device used to measure the strength and/or direction of the magnetic field in the vicinity of the device, and can be used to determine a direction (e.g., a compass direction) in which a person or device is facing. Other types of movement sensors could additionally, or alternatively, be used.

The movement sensor 402 may be used, for example, to determine when, how much, and/or how quickly, a user wearing the glasses 102 turns or moves his or her head or body to the right, left, tilted up, or tilted down. The sensor 402 may also be able to determine a cardinal direction in which the user is facing.

Microphone 404 may be any acoustic-to-electric transducer or sensor that converts sound into an electrical signal. For example, microphone 404 may use electromagnetic induction, capacitance change, piezoelectric generation, or light modulation, among other techniques, to produce an electrical voltage signal from mechanical vibration. The microphone 404 may communicate with a speech recognition program at computing device 202 to allow a user to speak voice commands that cause the computing device 202 to take particular action(s). The microphone 404 may also be used for other purposes.

While one planar direction input device 122, one movement sensor 402, and one microphone 404 is illustrated in FIG. 4a, in some embodiments a subset of these devices may be provided. In at least one embodiment, a plurality of planar direction input devices may be disposed on the stem 116 and/or the stem 114 (see, for example, FIG. 4c, discussed in more detail below). In another embodiment, an array of (same or different) microphones or array of (same or different) movement sensors may be provided on the stem 116 and/or the stem 114. Additionally, the planar direction input device 122 may be provided having a different shape (rectangular, circular, polygonal, irregular, etc.) or dimensions than that shown in FIG. 4a (see, for example, FIG. 4d below).

Figure 4B:
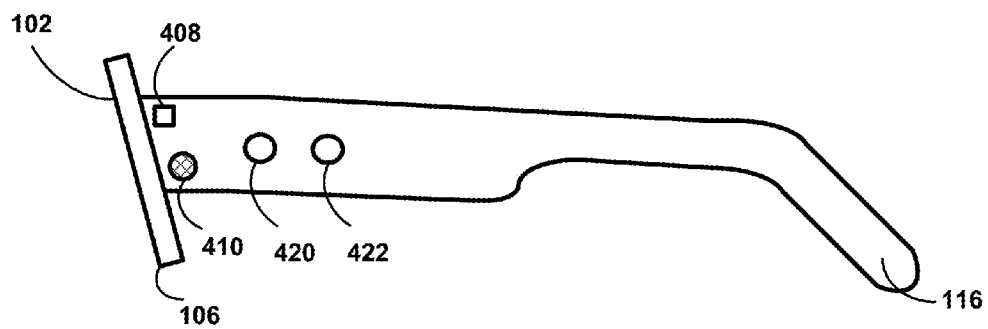
FIG. 4b shows another example configuration of various input interfaces for a wearable heads-up display device, including an optical reference object tracking input device.

FIG. 4b illustrates an additional or alternative input device for interacting with glasses 102 and computing device 202, and for entering text via a rotary wheel user interface displayed on one or more of the lenses 108, 110. As illustrated in FIG. 4b, an image capture device 420 and a light source 422 may be coupled to stem 116 (in addition to, or in place of, planar direction input device 122). Although the light source 422 and image capture device 420 are illustrated as separate devices, they may be combined into a single device.

The light source 422 and image capture device 420 work together to illuminate a surface of a user's finger (or other reference object), and to detect the unique, fine patterns in the surface of the user's finger (or other reference object). By capturing images of these patterns many times per second (e.g., hundreds or thousands of times per second), slight movements in the user's finger can be detected by the image capture device 420 by comparing a reference frame (previous image) to a current frame (present image), and the difference transformed into corresponding movements (for example, in the planar direction relative to a surface of a lens provided at an outer surface of the optical imaging device or a surface of the stem 116, and/or in a perpendicular direction relative to the same surfaces) for input to computing device 202.

The light source 422 may be, for example, a laser or LED that emits light in the visible (e.g., red) or invisible (e.g., infrared) spectrum. The image capture device 420 may be a complementary metal-oxide-semiconductor (CMOS) or charge-coupled device (CCD) image capture device capable of detecting wavelengths in the range emitted by the light source 422. Because the light source 422 and image capture device 420 may not need as wide a surface as the touch-sensitive surface 122, and although not illustrated in FIG. 4b, the stem 116 may be formed narrower than in the example illustrated with respect to FIG. 4a.

Figure 4C:
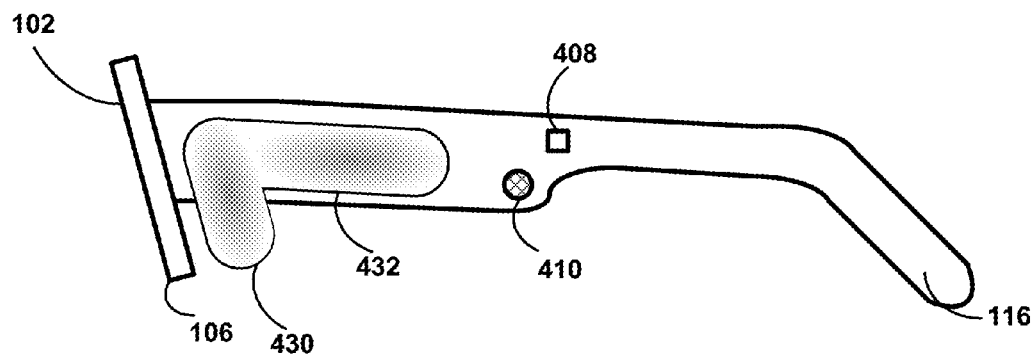
FIG. 4c shows another example configuration of various input interfaces for a wearable heads-up display device, including an L-shaped touch-sensitive input device.

FIG. 4c illustrates a further additional or alternative input device for interacting with glasses 102 and computing device 202, and for entering text via a rotary wheel user interface displayed on one or more of the lenses 108, 110. While FIG. 4a illustrated an input device comprising a single linear touch-sensitive surface planar direction input device 122, as illustrated in FIG. 4c, a non-linear touch-sensitive surface planar direction input device may be provided comprising a vertically extending portion 430 and a horizontally extending portion 432. The vertically extending portion 430 may provide a longer vertical gesturing space relative to the horizontally extending portion 432. The vertically extending portion 430 may be provided in a more forward location relative to the front of the glasses 102 (e.g., towards the lens frames 104, 106) as illustrated in FIG. 4c, perhaps requiring the re-positioning of input devices 408 and/or 410, or may alternatively be disposed at a rearward location of the horizontally extending portion 432 relative to the front of the glasses 102, or anywhere in between.

While this arrangement provides for additional gesturing space and allows a user to create more advanced input patterns, it also blocks more light from a user's field of view, and blocks a user's peripheral vision to a greater extent than the integrated planar direction input device 122 of FIG. 4a. Thus, in this scenario, the level of translucency and/or transparency of the touch-sensitive surface planar direction input device portions 430, 432 may become more important.

Figure 4D:
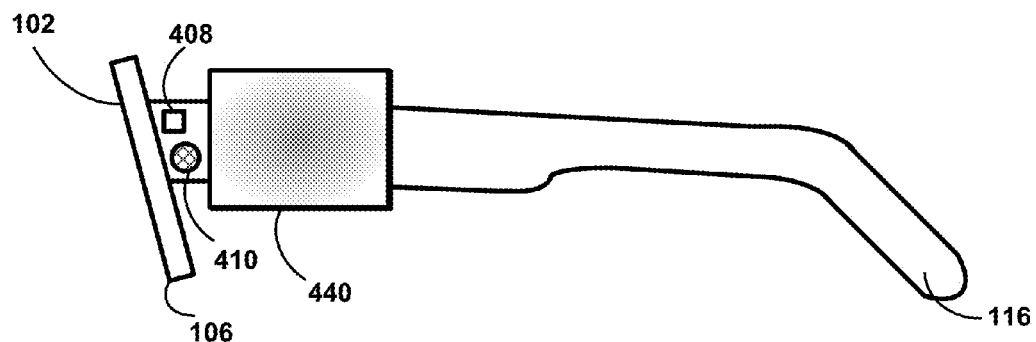
FIG. 4d shows another example configuration of various input interfaces for a wearable heads-up display device, including an enlarged planar direction input device.

FIG. 4d illustrates another additional or alternative embodiment for interacting with glasses 102 and computing device 202, and for entering text via a rotary wheel user interface displayed on one or more of the lenses 108, 110. While FIG. 4a illustrated a linearly extending touch-sensitive surface planar direction input device 122 that was contained within the width-confines of the stem 116 on which it was attached, as illustrated in FIG. 4d, a linearly extending touch-sensitive surface planar direction input device 440 may be coupled to stem 116 and extend beyond the edges of the stem 116. For example, the touch-sensitive surface may be 1.5-3.0 times wider than the width of the stem 116 to which it is attached.

While this arrangement provides for additional gesturing space and allows a user to create more advanced input patterns, similar to the example set forth in FIG. 4c, it may also block more light from a user's field of view, and blocks a user's peripheral vision to a greater extent than the integrated planar direction input device 122 of FIG. 4a. Thus, in this scenario as well, the level of translucency and/or transparency of the touch-sensitive surface planar direction input device 440 may be more important.

Additionally, and advantageously, the input device 440 in this arrangement may be removable from the stem 116, and may be attached only when needed by a heads-up display user. Removable fasteners may include, among others, hook and loop, hook and tabs, buttons, snaps, friction fittings, screws, strike and latch fittings, compression fittings, rivets, and grommets. Permanent fasteners could additionally or alternatively be used. An electrical connection to the input device 440 may be provided via a connector on the outer-surface of the stem 116, and communication between the input device 440 and computing device 202 may take place via a wired or wireless connection.

Figure 4E:
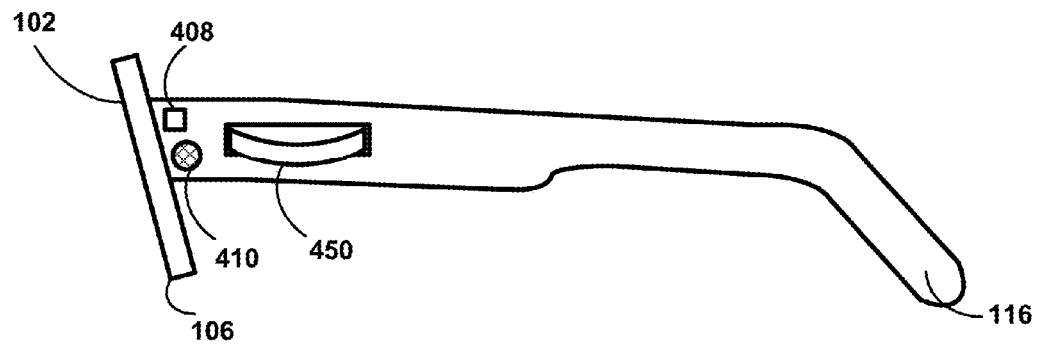
FIG. 4e shows another example configuration of various input interfaces for a wearable heads-up display device, including a scroll-wheel mechanical input device.

FIG. 4e illustrates another additional or alternative embodiment for interacting with glasses 102 and computing device 202, and for entering text via a rotary wheel user interface displayed on one or more of the lenses 108, 110. As illustrated in FIG. 4e, a mechanical planar direction input device 450, such as a scroll wheel, may be coupled to stem 116. The scroll wheel 450 may be rotatable in a first direction (left and right/forward and backward in FIG. 4e) and tiltable in a second direction (up and down in FIG. 4e) to provide a full range of planar direction inputs to glasses 102. The scroll wheel 450 may also be depressible (in the normal direction to FIG. 4e) to provide further input options to the illustrated input interface. Multiple scroll wheels could be used as well—for example a horizontal scroll wheel and a vertical scroll wheel. Other types of mechanical input devices could be used as well, including, for example, a pointing stick that can be moved in a plurality of planar directions so as to provide corresponding input to glasses 102 and/or a track ball that can be rotated in a variety of planar directions.

The input interfaces illustrated in FIGS. 4a-e may be coupled via wire(s) or wirelessly coupled to the computing device 202 (in one embodiment, via connection 206) to allow a user to control settings and features of the wearable heads-up display system 200, to communicate with other wearable heads-up displays, to provide positioning and/or movement information from sensor 402, to enter text via a rotary wheel user interface, and/or to control and otherwise interact with displays on the lens 108, 110.

2. Text Entry Using a Rotary Wheel User Interface

Figure 5:
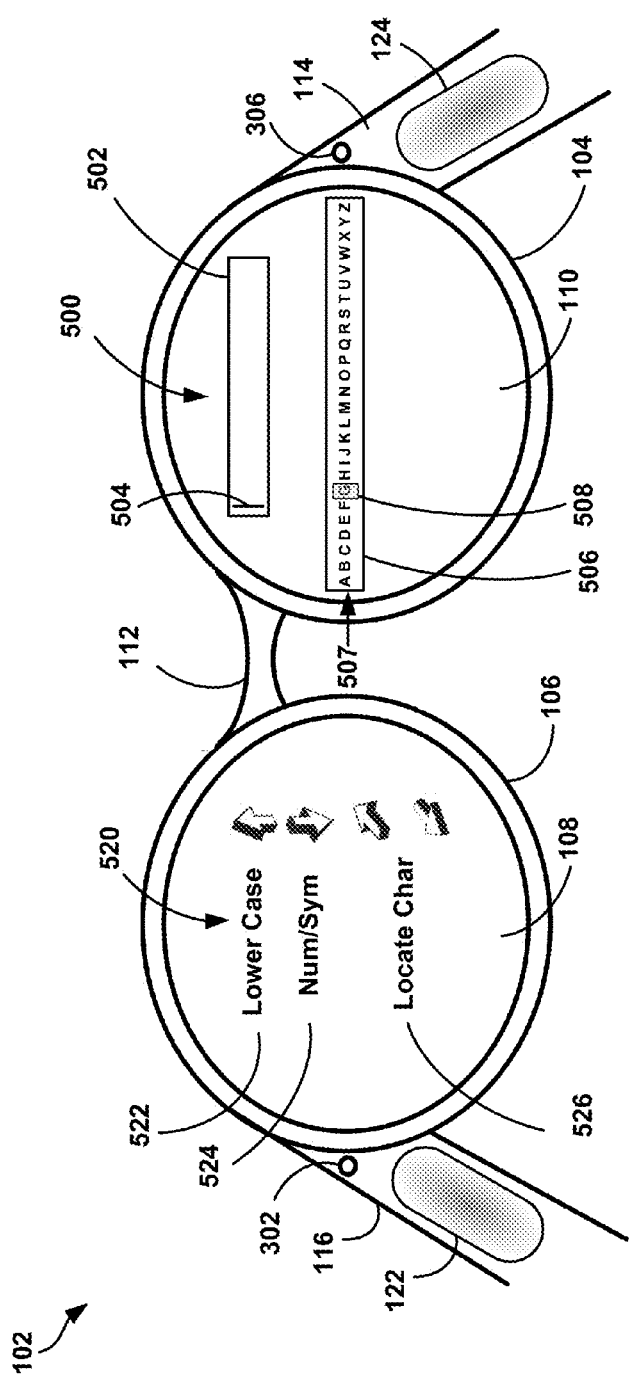
FIG. 5 illustrates an example method of interacting with a heads-up display device using the various input configurations of FIGS. 4a-e.

FIG. 5 illustrates an example text entry user interface in which one or more input devices, such as those illustrated with respect to FIGS. 4a-e above, may be used to interact with and enter text into a computing system such as the wearable heads-up display system 200. Several difficulties arise in placing the input devices such as those illustrated with respect to FIGS. 4a-e above, on a stem of a pair of glasses. For example, when in use, a wearer has no visibility of the input device. Additionally, the orientation is unusual and different from traditional touch devices that are normally placed directly in front of a user. Physical design characteristics of the input interfaces and input methods and processes have been developed to address these concerns, as set forth throughout this disclosure. Once these difficulties are overcome, additional features and advantages of having a continuously available, wearable personal electronics device with a flexible input device allowing complex input commands and text entry can be realized, as also set forth throughout this disclosure. While particular advantages are realized with respect to wearable devices, the input methods and processes disclosed herein can also realize advantages on other electronic devices, such as mobile phones. For example, the disclosed input methods and processes may allow for easier and more efficient one-handed text entry into a mobile device. Other advantages exist as well.

FIG. 5 illustrates one example of a text entry input method that aids a user in acclimating to the unusual orientation of the input interface on the glasses 102, and to the inability to directly view the input interface when operating it. Specifically, FIG. 5 illustrates a display of a text entry box and a rotary wheel input interface. Of course, this figure is exemplary in nature only, and many other applications and combinations of input commands and associated functions are possible in light of this disclosure. Using the rotary wheel user interface of FIG. 5, text may be entered (such as into an e-mail, instant message, or document) via one or more of the input interfaces illustrated in FIGS. 4a-e above.

Although FIG. 5 illustrates a simultaneous display of different content on both lenses 108 and 110, such simultaneous displays of content in overlapping regions of the bi-focal human vision field could confuse and/or disorient a user as a result of the brain's attempts to combine and make sense of the two differing displays. Accordingly, steps may be taken to prevent such confusion and/or disorientation. In one embodiment, both lenses 108, 110 may be populated with overlapping content, and a user may be expected or instructed to close one eye to focus on one lens 108, 110 at a time. In another embodiment, only one of the lenses 108, 110 is configured to contain the information illustrated in FIG. 5 at any one time. In a further embodiment, both lenses 108, 110 may be populated, but with corresponding overlapping portions of one of the displays 108, 110 eliminated, faded, blurred, or otherwise augmented to prevent visual confusion and/or disorientation at intersecting regions of the displayed content. Other possibilities exist as well.

As illustrated in FIG. 5, a text entry rotary user interface 500 projected on lens 110 by projecting device 306 may include a text box 502, a text box cursor 504, a rotary wheel 506, a currently-active character line 507, and a character locator indicator 508. Text entered into text box 502 may comprise, for example, content for use in populating an e-mail, text message, or document, as set forth earlier. Operation of text entry rotary user interface 500 will be described in more detail with respect to FIGS. 6a-6i and 7a-7b.

Returning to FIG. 5, and in order to aid a user in determining how to use one or more of the input devices of FIGS. 4a-e to interface with the text entry rotary user interface 500, and perhaps prior to displaying the text entry rotary user interface 500 in lens 110, upon request, or at periodic intervals, a help display 520 intended to inform the user of methods of entering text via the text entry rotary user interface 500 may be displayed on lens 108 via projecting device 302. During the time in which the help display 522 is being displayed, the text entry rotary user interface 500 may be removed from lens 110, corresponding overlapping portions of the text entry rotary user interface 500 augmented, or a user expected or instructed to close a corresponding eye looking through lens 110. In this example, the help display 520 includes a Lower Case character set command 522, a Number/Symbols character set command 524, and a Locate Character command 526. Each of the commands 522-526 is displayed with a corresponding symbol illustrating an input operation that may be executed via one or more of the input devices of FIGS. 4a-e to execute the associated displayed function.

For example, the Lower Case command 522 may be executed by a user activating (e.g., with respect to a touch-sensitive input device, swiping a finger across) the planar direction input device 122 or 124 in an upwards direction as indicated by the upward facing arrow symbol of FIG. 5. In response to receiving the Lower Case command 522, the rotary wheel 506 may switch (e.g., rotate) to displaying a new currently-active character line 507 including a lower case character set for selection and entry into text box 502.

The Numbers/Symbols command 524 may be executed by a user activating (e.g., with respect to a touch-sensitive input device, swiping a finger across) the planar direction input device 122 or 124 in a downwards direction as indicated by the downward facing arrow symbol in FIG. 5. In response to receiving the Numbers/Symbols command 524, the rotary wheel 506 may switch to displaying a new currently-active character line displaying a numbers/characters character set for selection and entry into text box 502. The Locate Character command 526 (as indicated by the forward and rearward facing arrows) may cause the character locator indicator 508 to move left and right within the currently-active character line 507 of the rotary wheel 506 in response to activating the planar direction input device 122 or 124 in a respective forward and rearward direction.

In response to receiving either of the Lower Case command 522 or the Numbers/Symbols command 524, and after responsively displaying a new currently-active character line 507 in rotary wheel 506, updated commands may be displayed in help display 520 with respect to character lines now adjacent to the currently-active character line 507 in the rotary wheel 506, as set forth in more detail below.

In one embodiment, the commands and their associated functions displayed in help display 520 may be modified by a user. For example, although in FIG. 5 a forward and backward activation of a planar direction input device 122, 124 is associated with locating a character in a currently-active character line 507 of rotary wheel 506, it may be more intuitive for some users that an upward and downward activation of a planar direction input device 122, 124 locates a character in a currently-active character line 507 of rotary wheel 506. Additionally, users may have the option of toggling the mapping of the forward and backward movement to left and right selections. Associations between commands and functions may, for example, be stored in a list or database in computing device 202 and/or at remote device 210.

A locally or remotely accessible interface may allow the user to access the stored list or database and modify the associations. For example, the user may be able to access the computing device 202 and/or the remote device 210 via a wired or wireless connection, and modify the Locate Character command 526 to be associated with upward and downward activations of a planar direction input device 122, 124 instead of forward and backward activations. The computing device 202 (or remote device 210) may, in response to recognizing that the newly assigned upward and downward activations were previously assigned to another function (Lower Case and Numbers/Symbol functions), request the user to associate new commands with the Lower Case and Numbers/Symbols functions.

In response, for example, the user may record a forward activation of planar direction input device 122, 124 as being associated with the Lower Case command 522 and a backward activation of planar direction input device 122, 124 as being associated with the Numbers/Symbols command 524. The selection of a new command may be executed by a user selecting the new command from a list, or may be executed by the user entering the new command via the planar direction input device 122, 124 when requested (e.g., swiping forward across the planar direction input device 122, 124 when requested). In this manner, unique patterns of input commands can be created by a user, and personalized per user, by recording a finger-motion pattern detected at the planar direction input device 122, 124 when requested.

In some embodiments, the help display 520 may be displayed in lens 108 and/or 110 when the text entry rotary user interface 500 is first started and/or displayed, so as to remind the user of the available input commands executable via planar direction input device 122 and/or 124 to navigate the text entry rotary user interface 500. After displaying the help display 520 for some period of time (e.g., 1-5 seconds), the help display 520 may be replaced with the text entry rotary user interface 500 (in lens 108 and/or 110). Subsequently, the help display 520 could be re-displayed in response to user input. The user input could be, for example, a particular motion across planar direction input device 122 or 124 associated with displaying help display 520. Help display 520 might also be displayed when an algorithm executing at computing device 202 detects that a user is having difficulty navigating via planar direction input device 122 or 124. Computing device 202 may detect that a user is having difficulty navigating based on a number of unrecognized movements across planar direction input device 122 or 124, a number of times that a user "undoes" a previous command by subsequently doing the opposite, or by some other combination of input and logic.

FIGS. 6a-6i illustrate example text-entry embodiment in which text may be entered into text entry rotary user interface 500. In these examples, while the input device set forth in FIG. 4a will be described in detail with respect to the text-entry embodiments set forth in FIGS. 6a-6i, it should be understood that any of the other input devices set forth in FIGS. 4b-4e could be used. In particular instances where one of the input devices of FIGS. 4b-4e provide some distinct advantage or difference in comparison to the input device of FIG. 4a, the advantage or difference will be specifically addressed. It should be noted that in the event one of the input devices of FIGS. 4b-4e is specifically addressed, such specific advantages or differences may be similarly applicable to any one of the other input interfaces of FIGS. 4a-4e, and the separate disclosure should not be viewed as any way limiting to the particular input interface device described.

Figure 6A:
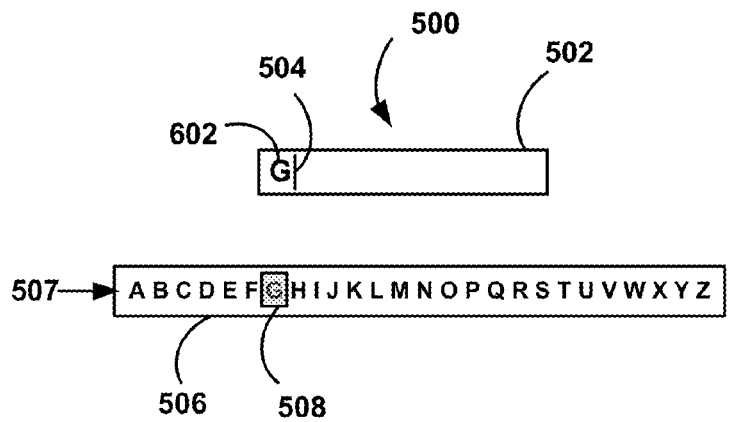
FIGS. 6a-i illustrate more detailed examples of text entry methods using one of the various input configurations of FIGS. 4a-e.

As shown in FIG. 6a, and as already set forth in FIG. 5, text entry rotary user interface 500 may include a text box 502, a text box cursor 504, a rotary wheel user interface 506, and a character locator indicator 508. The text box 502 may be any type of text entry location, and instead of a formal box 502, may simply be an area of an e-mail, web-address bar, text message, etc., that in any event indicates that text may be entered via text entry rotary user interface 500. Inside of text box 502, text box cursor 504 may provide some indication of where a next character, selected from rotary wheel 506, will be placed. In some embodiments, the text box cursor 504 may blink on and off at a regular interval.

The rotary wheel 506 is a "virtual" rotary wheel (e.g., cylinder) comprised of a plurality of character lines, each character line comprising a plurality of text-entry characters that may be selected and subsequently displayed in text box 502. What is meant by a "virtual" rotary wheel is that commands received via an input device (such as the Lower Case command 522 and Numbers/Symbols command 524) may cause the rotary wheel to rotate, or scroll, such that a previously-displayed currently-active character line is no longer displayed, and a new character line that was not previously-displayed is newly displayed as the currently-active character line. The virtual scrolling of the rotary wheel can be conceptually envisioned as a plurality of character lines imprinted longitudinally from one end of the wheel (e.g., cylinder) to another, and where only a small window onto a longitudinal region of the cylinder (from end to end, along an outer surface of the cylinder) can be viewed at any one time. Rotating the wheel causes a new character line to be viewable through the small window, and a previously viewable character line to no longer be viewable. While in FIGS. 6a-6i, only one character line is viewable at a time, in other embodiments, and as discussed in more detail with respect to FIGS. 7a-7b, multiple character lines may be viewable at a time, while only one remains currently active.

Each character line of the rotary wheel 506 includes a plurality of linearly-arranged characters that can be selected for entry into text box 502. For example, and as illustrated in FIG. 6a, a character line may include an English-language alphabet capital letter character set consisting of the letters "A-Z." Of course, other languages could additionally or alternatively be implemented, and various arrangements (e.g., instead of alphabetical), of the letters could be implemented. In one example, a QWERTY arrangement of letters may be implemented instead, such that each of three character lines in the rotary wheel 506 contains a plurality of capital letters arranged in a similar manner to a QWERTY keyboard, and such that vertical rotations of the rotary wheel 506 cause corresponding different lines of the QWERTY arrangement to be displayed (e.g., one character line may display characters "Q-P," another character line may display characters "A-L," and a third character line may display characters "Z-M"). Other arrangements are possible as well. Furthermore, instead of an entire character line displayed at one time, only a portion of a character line may be displayed via rotary wheel 506, and the currently-active character line may be scrollable in a horizontal direction to display additional available characters in the currently-active character line, an arrangement that will be described in more detail with respect to FIG. 6i. Other display techniques are possible as well.

Assuming the input device set forth in FIG. 4a is being used, various input patterns may cause various changes to rotary wheel 506 and/or the selection of a particular character in a currently-active character line 507, and entry of the selected character into text box 502. For example, a first input received via a planar direction input device 122, 124 in a first planar direction, such as up or down, may cause the rotary wheel 506 to rotate and display a new character set in the currently-active character line 507. In one arrangement, and in response to detecting an upwards swipe across planar direction input device 122, rotary wheel 506 may cause a new character set having one or more lower case characters to replace the character set illustrated in FIG. 6a that includes upper case characters. Other possibilities exist as well.

Once a desired currently-active character line 507 is selected, a second input received via the planar direction input device 122, 124 in a second planar direction different from the first planar direction (for example, forwards or backwards), may locate a character within the currently-active character line 507. Locating a character within the currently-active character line 507 means that, in response to the second input, a visual indication is provided indicating what character would be selected if a subsequent third input (a selection input) were immediately received via the planar direction input device 122, 124. Any number of visual indicators may be provided to indicate a currently "located" character, such as a shaded selection box as indicated for the character locator indicator 508 in FIG. 6a. Other indicators may include a color change, a brightness change, a size change, a position offset (movement or copy of the currently-located character, above, below, or to the side), and a background change, among others.

Once a desired character is located within a currently-active character line 507, a third input received via the planar direction input device 122, 124 may select the currently-located character and cause the selected character to be added to the text box 502, at the location indicated by the text box cursor 504. The third input may comprise, for example, a detected lifting of the finger (or other reference object) off of the planar direction input device 122, 124. Additionally or alternatively, the third input may include (i) detecting a swipe across the planar direction input device 122, 124 at a speed above a minimum threshold speed (such as, e.g., greater than 2 inches per second or greater than 4 inches per second), (ii) a perpendicular depression of the planar direction input device 122, 124 (e.g., a "click"), (iii) a dwell time (e.g., greater than 500 ms or greater than 1 second), or some other input pattern. In one embodiment, different third inputs may cause different variations of characters to be inserted into text box 502.

For example, a third input comprising an upwards-detected swipe across the planar direction input device 122, 124 (instead of perhaps a usual release of the finger from the planar direction input device 122, 124) may cause a shifted version of the selected character to be inserted into text box 502. If one of a lower case and upper case version of a character letter is selected via an upwards swipe instead of a release, the other of the lower case and upper case character letter may be inserted into text box 502 instead.

Other variations are possible as well. For example, if a number is selected via an upwards swipe instead of a release, a symbol corresponding to that number may be inserted into the text box 502 (for example, a $ symbol for an upwards swipe when selecting a number character 4 via the text entry rotary user interface 500). In the example set forth in FIG. 6*a*, a second input causes the character locator indicator 508 to be positioned over the upper case G character, and a third input causes the upper case G 602 to be selected and displayed in text box 502. Other possibilities exist as well.

Figure 6B:
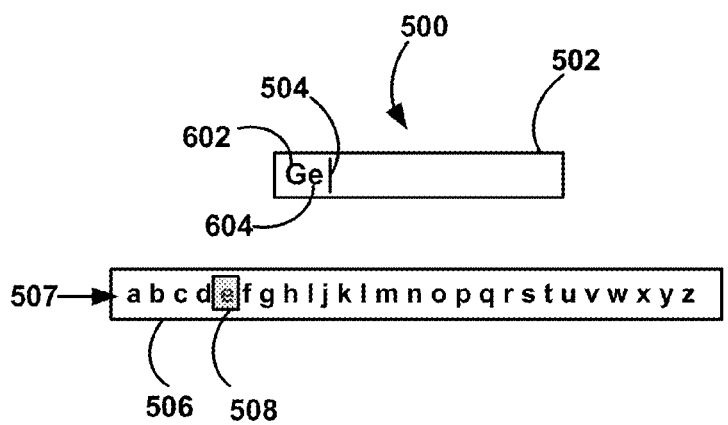

FIG. 6*b* illustrates a further example of inputting text via text entry rotary user interface 500. In this example, a first input causes the rotary wheel 506 of FIG. 6*a* to rotate and display a new lower case character set as the currently-active character line 507 including the set of lower case characters "a-z". A subsequent second input causes the character locator indicator 508 to be positioned over the lower case e character. And a third input causes the lower case e 604 to be selected and displayed in text box 502.

Figure 6C:
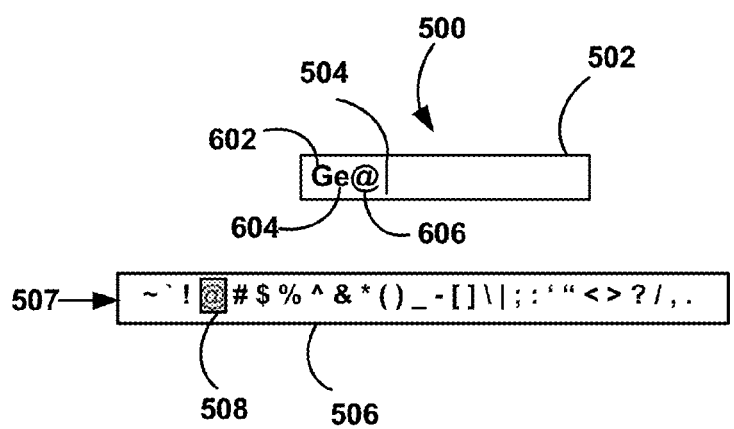

FIG. 6*c* illustrates still another example of inputting text via text entry rotary user interface 500. In this example, a first input causes the rotary wheel 506 of FIG. 6*b* to rotate and display a new symbols character set as the currently-active character line 507, including the set of symbol characters "~" through ".". A subsequent second input causes the character locator indicator 508 to be positioned over the character symbol @. And a third input causes the symbol @ to be selected and displayed in text box 502.

Figure 6D:
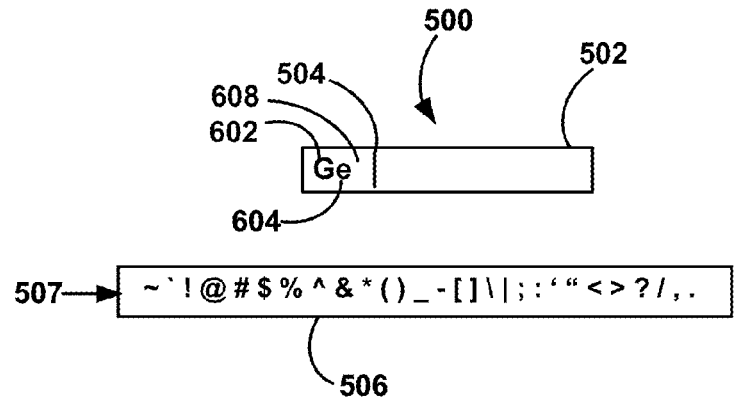

FIG. 6*d* illustrates a further example of inputting text via text entry rotary user interface 500. In addition to characters displayed via the rotary wheel 506, special text characters may be associated with pre-defined input gestures detected via an input device such as the planar direction input device 122, 124. For example, a backspace (e.g., a deletion of a previously-entered character or whitespace) may be associated with a detected swipe across the planar direction input device 122, 124 in a backwards direction above a threshold velocity (such as, e.g., perhaps greater than 2 inches per second or greater than 4 inches per second). The backspace function could be distinguished from a selection function (that may also be based on a detected velocity) based on a pattern of input detected before the higher velocity detected input. For example, in the backspace function scenario, the higher velocity backwards swipe is detected without any previously detected continuous swipes, whereas the character selection higher velocity swipe is preceded by a continuous and slower motion vertical movement (to select a character line) and/or continuous and slower motion horizontal movement (to locate a character in a character line). FIG. 6*d* illustrates the deletion of the previously entered @ symbol 606 from text box 502, as shown in FIG. 6*c*, leaving just the previously entered G character 602 and e character 604 in text box 502 of FIG. 6*d*.

Other types of pre-defined input gestures and associated special characters could be used as well. For example, a whitespace character (such as a space between words) may be associated with a quick tap of the planar direction input device 122, 124 without a substantial detected movement in the vertical (to select a character line) or horizontal (to locate a character in a currently-active character line) directions. FIG. 6*d* also illustrates the inclusion of a whitespace character 608 in text box 502, as the text box cursor 504 is correspondingly moved over to the right at least one character width after the deletion of the @ symbol to include white space character 608.

Figure 6E:
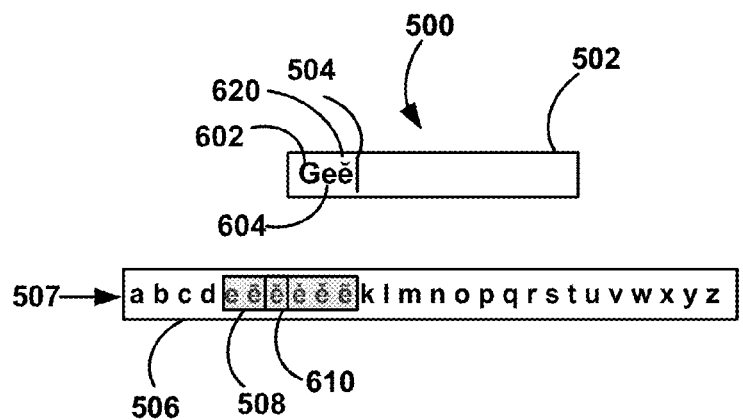
Figure 6F:
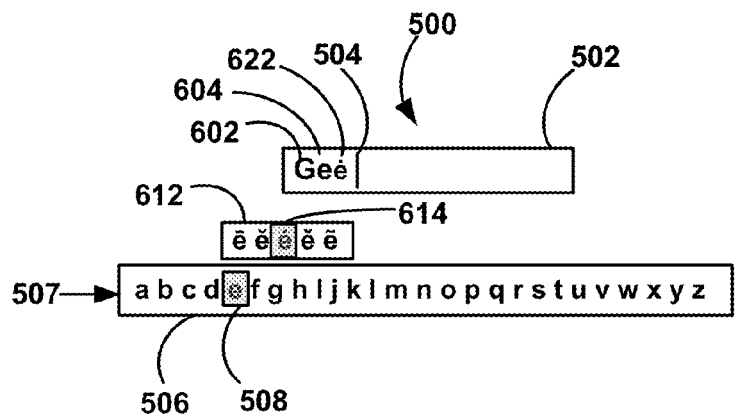

FIGS. 6*e*-6*f* illustrate a further example of inputting text via text entry rotary user interface 500 that takes advantage of a fourth additional input detected via an input interface such as the planar direction input device 122, 124. The fourth input may be received after the second input and before the third input, and may comprise a particular planar direction motion or a dwell time detected via planar direction input device 122, 124. For example, a dwell time may include detecting that a reference object, such as a user's finger, has remained in substantially a same area of the planar direction input device 122, 124 for a threshold period of time. The threshold period of time may be, for example, greater than 250 ms or greater than 1 second.

In response to detecting the fourth input, augmented versions of the currently-located character may be displayed in an overlapping or non-overlapping manner with respect to the currently-active character line 507 of rotary wheel 506. Augmented versions of the currently-located character could include, for example, one or more of accented versions, capitalized versions, lower-case versions, and associated symbols of the currently-located character. For example, and as illustrated in FIG. 6*e*, the character selection box 508 may be expanded to overlap previously-displayed characters "f-j" and may include augmented versions (in this case, accented versions) of the reference character "e" including "ē ĕ é ě ê". One of the accented versions of the reference character could then be located via a further second input, and once a desired accented character is located (perhaps via second character locater indicator 610 or some other indication mechanism), could then be selected via the third input. FIG. 6*e* illustrates the selection of the accented character ĕ and the insertion of the ĕ character in text box 502.

FIG. 6*f* illustrates an alternative embodiment in which character locator indicator 508 may remain in the currently-active character line 507 of rotary wheel 506, and a separate augmented character selection box 612, including the augmented versions of the reference character (e.g., accented versions), displayed above the rotary wheel 506. A second character locator indicator 614 may be displayed within the separate augmented character selection box 612. Similar to FIG. 6*e*, one of the accented versions of the reference character in FIG. 6*f* could then be located via a further second input and selected via the third input. FIG. 6*f* illustrates the selection of the accented character e and the insertion of the e character in text box 502.

Figure 6G:
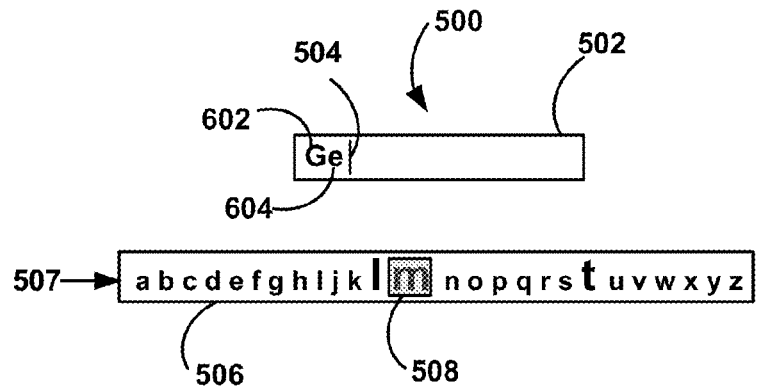

FIG. 6*g* illustrates a further example of inputting text via text entry rotary user interface 500. In this example, characters displayed in a currently-active character line 507 are augmented in some fashion dependent upon some form of auto-completion algorithm. The auto-completion algorithm may be based on, for example, a dictionary file that contains a large number of words, and that, based on text thus far entered into the text box 502, matches one or more possible words from the dictionary file that could complete the partial word represented by the text thus far entered. Alternative or additional algorithms could be applied as well, including, for example, looking at previously entered words and matching text thus far entered into the text box 502 with one or more previously entered words. Combinations of algorithms could be used as well.

Based on the results of the algorithm, predicted or likely next characters from the currently-active character line 507 displayed in rotary wheel 506 may be visually augmented to make them easier to locate and/or select. In the example shown in FIG. 6g, matching next letters are indicated via an increased font size relative to the other letters in the currently-active character line 507 (in this example, "l," "m," and "t" are augmented, perhaps matching a dictionary or previously-entered words such as "gel," "gem," or "get"). Other types of visible augmentation could be used in addition or in place of the font size change, such as a color change, a foreground or background highlighting, a character attribute change (bold, underline, italics, etc.), and a character-border size increase, among other possibilities.

Figure 6H:
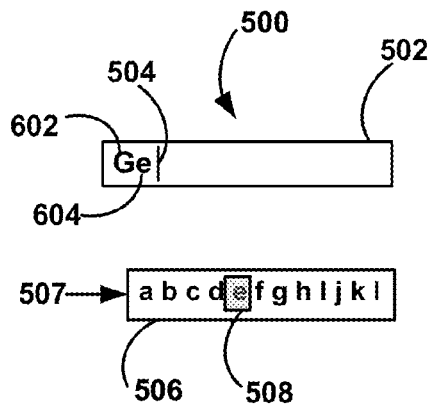
Figure 6I:
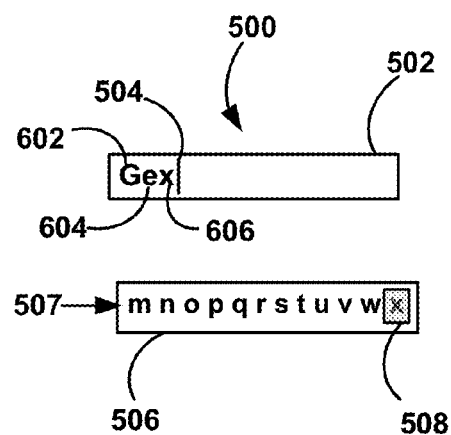

FIGS. 6h-6i illustrate further examples of inputting text via text entry rotary user interface 500 that requires a smaller area (e.g., width) for each character line in the rotary wheel 506. In the example of FIG. 6h, only a portion of a full character set is provide on each character line of the underlying "virtual wheel" that makes up the rotary wheel 506. For example, letters "a-l" may be provided on one line, as illustrated in FIG. 6h, letters "m-t" provided on a second line (accessible via a first input received from one of the aforementioned input interfaces), and letters "u-z" provided on a third line. By breaking up the English alphabet character set across three lines in this manner, the horizontal display space can be reduced and/or a font size can be increased for the characters in each character line. Other types of character sets could be split up in a similar fashion. In another embodiment, the character locator indicator 508 may be caused to remain stationary, centered along a width of the character line. A detected second input could then cause the character line itself to shift in a corresponding horizontal direction so as to cause different characters to be rotated in and out of the centered character locator indicator 508. For example, with an initial display of 11 character in which the English alphabet character "f" is selected (e.g., "abde f ghijk"), a detected second input may cause the character line to shift to cause the English alphabet character "g" to be selected (e.g., "bcdef g hijkl"). Other possibilities exist as well.

In the example of FIG. 6i, the entire character set of the English alphabet is provided on a single character line of the "virtual wheel," however, only a portion of each character line is made visible at any one time. A horizontal scroll function is then provided that allows additional characters to be made visible (as other characters are removed from being displayed). For example, assuming the text box 506 initially appears including the characters "a-l" as set forth in FIG. 6h, a movement of the character locator indicator 508 to or past a right-most displayed character via a second input may cause a shift in the displayed characters of one or more positions to the right. For example, once the character locator indicator 508 is moved past the right-most "l" character of FIG. 6h, the currently-active character line 507 of rotary wheel 506 may be updated to display letters "m-x," as illustrated in FIG. 6i. Other threshold regions and other amounts of character shift could be implemented as well. As illustrated in FIG. 6i, a third input may then be received corresponding to a selection command while the character locator indicator 508 is located over the "x" character, and subsequently, an "x" character 606 inserted into the text box 502.

Figure 7A:
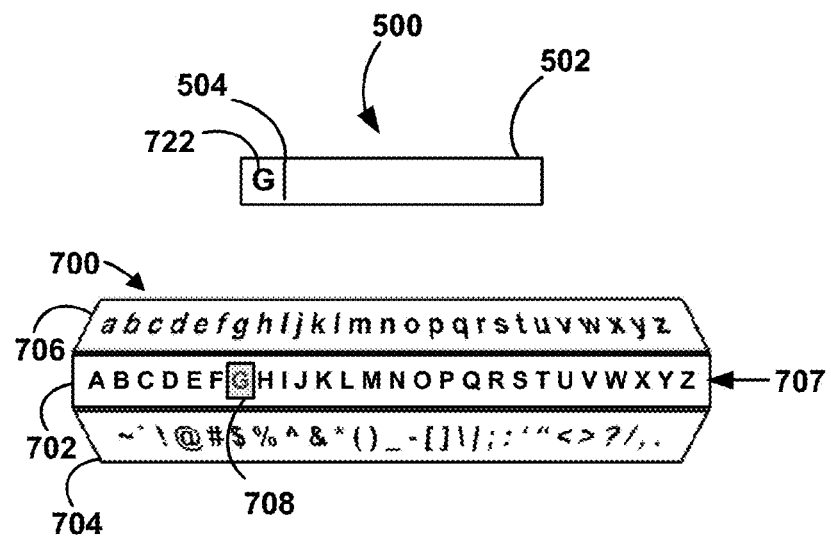
FIGS. 7a-b illustrate alternative user interfaces and text entry methods using one of the various input configurations of FIGS. 4a-e.
Figure 7B:
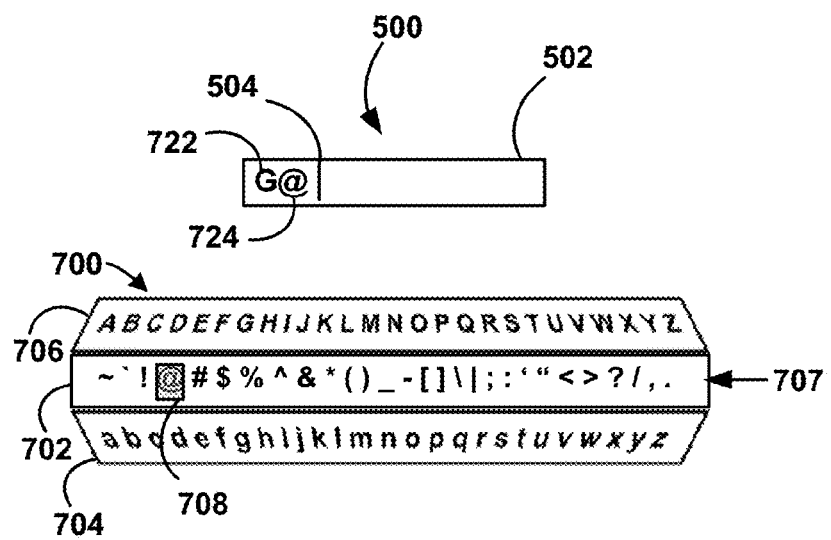

Other methods of displaying the rotary wheel 506 could be implemented as well. FIGS. 7a-7b illustrate an alternative text entry rotary user interface 500 in which character lines adjacent to a currently-active character line are made visible to aid a user in determining a most efficient route to making a desired character line the currently-active character line. For example, and as illustrated in FIG. 7a, a plurality of character lines 702-706 may be displayed at a same time, while only one of the displayed character lines is active for locating and selecting a character. Character line 702, for example, may be a currently-active character line in FIG. 7a and includes an upper-case character set of the English alphabet including letters "A-Z." Character line 704 includes a symbol character set. And character line 706 includes a lower-case character set of the English alphabet including letters "a-z."

For the currently-active character line 702, and similar to the rotary wheel 506 discussed earlier, a second input received via an input device may cause the character locator indicator 708 to move between the characters (in the horizontal direction of FIG. 7a) to locate a desired character for insertion into text box 502 at a position indicated by the text cursor 504. A subsequent third input received via the input device may cause the particular character located by the character locator indicator 508 to be selected and inserted into text box 502. Given the configuration set forth in FIG. 7a, this may cause the "G" character 722 to be selected and inserted into the text box 502.

Also similar to the rotary wheel 506, a first input received via an input device may cause the underlying "virtual wheel," on which character lines 702-706 are disposed, to rotate. For example, in response to detecting an upwards movement across one of the touch planar direction input devices 122, 124, the character lines 702-706 of the "virtual wheel" of FIG. 7a may be rotated into a new position indicated in FIG. 7b. More specifically, the currently active character line 702 is updated to display the symbol character set previously displayed in character line 704, the character line 706 is updated to display the upper-case character set of the English alphabet including letters "A-Z" previously displayed in character line 702 and the character line 704 is updated to display the lower-case character set of the English alphabet including letters "a-z" previously displayed in character line 706. Character lines 702, 704 and/or 706 can be visually augmented to provide an illusion of perspective, e.g., that the character lines are extending around a cylinder, as shown in FIGS. 7a and 7b.

The borders of each of the character lines 702-706 may be caused to rotate along with their respective character sets via a visual animation, the borders of each of the character lines 702-706 may remain stationary while only the character sets are animated to move from character line to character line, or some other type of visual animation could be used to illustrate the rotation of the "virtual wheel" caused by the received first input. The "virtual wheel" may be allowed to rotate infinitely in a single direction (e.g., a first character line is linked to a last character line such that a rotation past the last character line causes the first character line to be displayed again), or a stop may be enforced that prevents further rotation of the "virtual wheel" once a first or last character line is reached. Other examples are possible as well.

Once the symbol character set is now displayed as the currently-active character line 702, a second input received via the input device operates to locate the character locator indicator 708 above a particular one of the characters in the symbol character set (the "@" symbol), and a third input received via the input device operates to select the located character and cause a copy of the selected @ character 724 to be inserted into the text box 502.

Other methods of traversing the character lines 702-706 are possible as well. For example, in response to detecting a first input comprising an upwards movement across one of the touch planar direction input devices 122, 124, the character locator indicator 708 of FIG. 7*a* may be moved from character line 702 to character line 706, such that character line 706 effectively becomes the currently-active character line. In response to detecting another upwards movement across one of the touch planar direction input devices 122, 124, the "virtual wheel" may be rotated as discussed previously. Other possibilities exist as well.

Although FIGS. 5 through 7*b* are described in terms of input commands relative to planar direction input devices 122 and/or 124, the text entry rotary user interfaces 500, 700 may be similarly operated by any one of the input interfaces described with respect to FIGS. 4*b*-4*e*, and may be similarly operated by other known input interfaces not explicitly disclosed here. More specifically, interfacing with text entry rotary user interfaces 500, 700 may accomplished via one or more of the image capture device 420, 422, the vertically and/or horizontally extending portions 430, 432 of a touch-sensitive surface planar direction input device, the touch-sensitive surface planar direction input device 440, and the mechanical planar direction input device 450, among other options, in substantially the same manner as set forth above with respect to FIGS. 5 through 7*b*.

Particular variations may be implemented for particular ones of the input interfaces set forth in FIGS. 4*b*-4*e*. For example, in the case of the vertically extending portion 430 of the touch-sensitive surface planar direction input device, input received via the vertically extending portion 430 may correspond to a first input to cause a rotation of the rotary wheels displayed in the respective text entry rotary user interfaces 500, 700, while a similar gesture (e.g., perhaps an upwards-extending gesture) across the horizontally-positioned touch-sensitive surface 122 would not cause a rotation of the rotary wheels displayed in the respective text entry rotary user interfaces 500, 700 (although, it may cause some other function be performed). Second input to locate a character and third input to select a character may be received via the horizontally extending portion 432. Other arrangements and other variations are possible as well.

Figure 8:
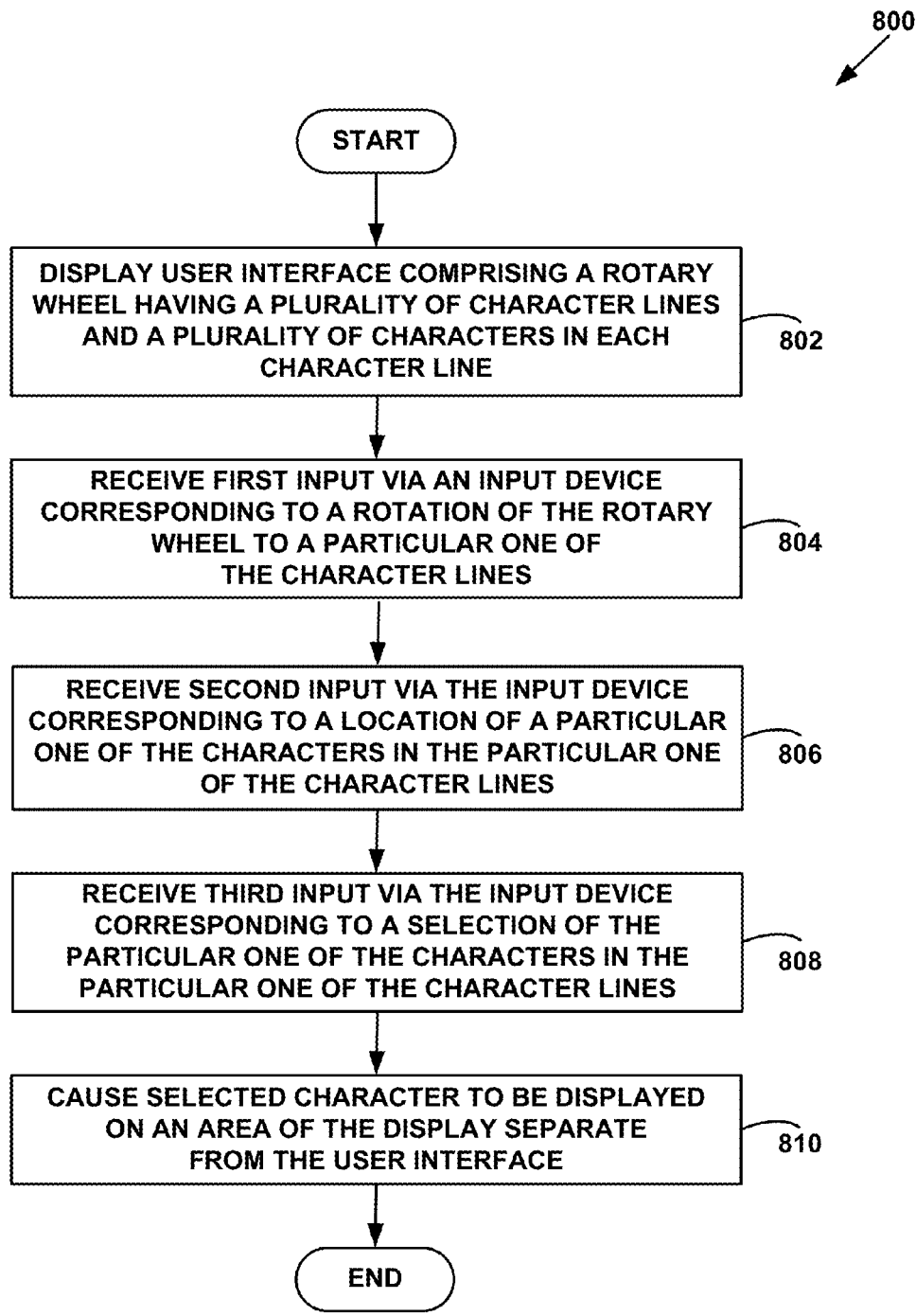
FIG. 8 is a flow-chart illustrating an example method of providing text entry to a wearable heads-up display device using one of the various input configurations of FIGS. 4a-e.

FIG. 8 is a flow-chart illustrating an example method 800 of interfacing with a computing device, such as a heads-up display including glasses 102, using a text entry rotary user interface for text entry. The method 800 includes a first display step 802, a first input step 804, a second input step 806, a third input step 808, and a second display step 810.

At step 802, a text entry rotary user interface is displayed, including a rotary wheel having a plurality of character lines and a plurality of characters in each character line, on a display of the computing device. Each of the character lines may correspond to all of or a part of a particular language's alphabet, or may correspond to one or more other types of symbols or characters, or some other possibility. The user interface may be displayed on a same device that receives an input to operate the user interface, or may be displayed on a separate device than that which receives the input. In one example, a transparent touch screen may be overlaid a display on which the user interface is provided. In another example, a touch sensitive device may be electronically coupled to a separate display device that displays the text entry rotary user interface. Other possibilities exist as well.

At step 804, a first input is received via an input device corresponding to a rotation of the rotary wheel to a particular one of the character lines. The input device may be any one of the input devices set forth in FIGS. 4*a*-4*e*, or some other input device. The first input may include a vertical or horizontal swipe across a touch-sensitive service, a tilt of a scroll wheel in an upwards or downwards direction or a horizontal direction, a scroll of a scroll wheel in a vertical or a horizontal direction, a movement of a reference object in a vertical or a horizontal direction offset from a surface of the input device, a single tap or click, a double tap or click, a voice command such as a spoken "rotate up" or "rotate forward," a head movement up or down or side-to-side, and other possibilities. In response to receiving the first input, the rotary wheel may be rotated in a corresponding or associated direction so as to replace a character set previously displayed in a currently-active character line with a different character set, or to select a new currently-active character line from amongst a plurality of displayed character lines, among other options.

At step 806, a second input is received via an input device corresponding to a location of a particular character within a currently-active character line. The input device may be any one of the input devices set forth in FIGS. 4*a*-4*e*, or some other input device. The second input may include a vertical or horizontal swipe across a touch-sensitive service, a tilt of a scroll wheel in an upwards or downwards direction or a horizontal direction, a scroll of a scroll wheel in a vertical or a horizontal direction, a movement of a reference object in a vertical or a horizontal direction offset from a surface of the input device, a single tap or click, a double tap or click, a voice command such as a spoken "rotate up" or "rotate forward," a head movement up or down or side-to-side, and other possibilities. In response to receiving the second input, an indicator may be moved so as to indicate a location of a particular one of the characters in the currently-active character line.

At step 808, a third input is received via an input device corresponding to a selection of the particular one of the characters located in step 806. The input device may be any one of the input devices set forth in FIGS. 4*a*-4*e*, or some other input device. The third input may include a vertical or horizontal swipe across a touch-sensitive service, a tilt of a scroll wheel in an upwards or downwards direction or a horizontal direction, a scroll of a scroll wheel in a vertical or a horizontal direction, a movement of a reference object in a vertical or a horizontal direction offset from a surface of the input device, a single tap or click, a double tap or click, a voice command such as a spoken "rotate up" or "rotate forward," a head movement up or down or side-to-side, and other possibilities.

In response to receiving the third input, a copy of the selected character is caused to be displayed on an area of the display separate from the text entry rotary user interface at step 810. For example, the area of the display separate from the text entry rotary user interface may be a text input box, an e-mail, an instant message, or a document.

3. Scratch-to-Select Text-Entry Technique

Figure 11:
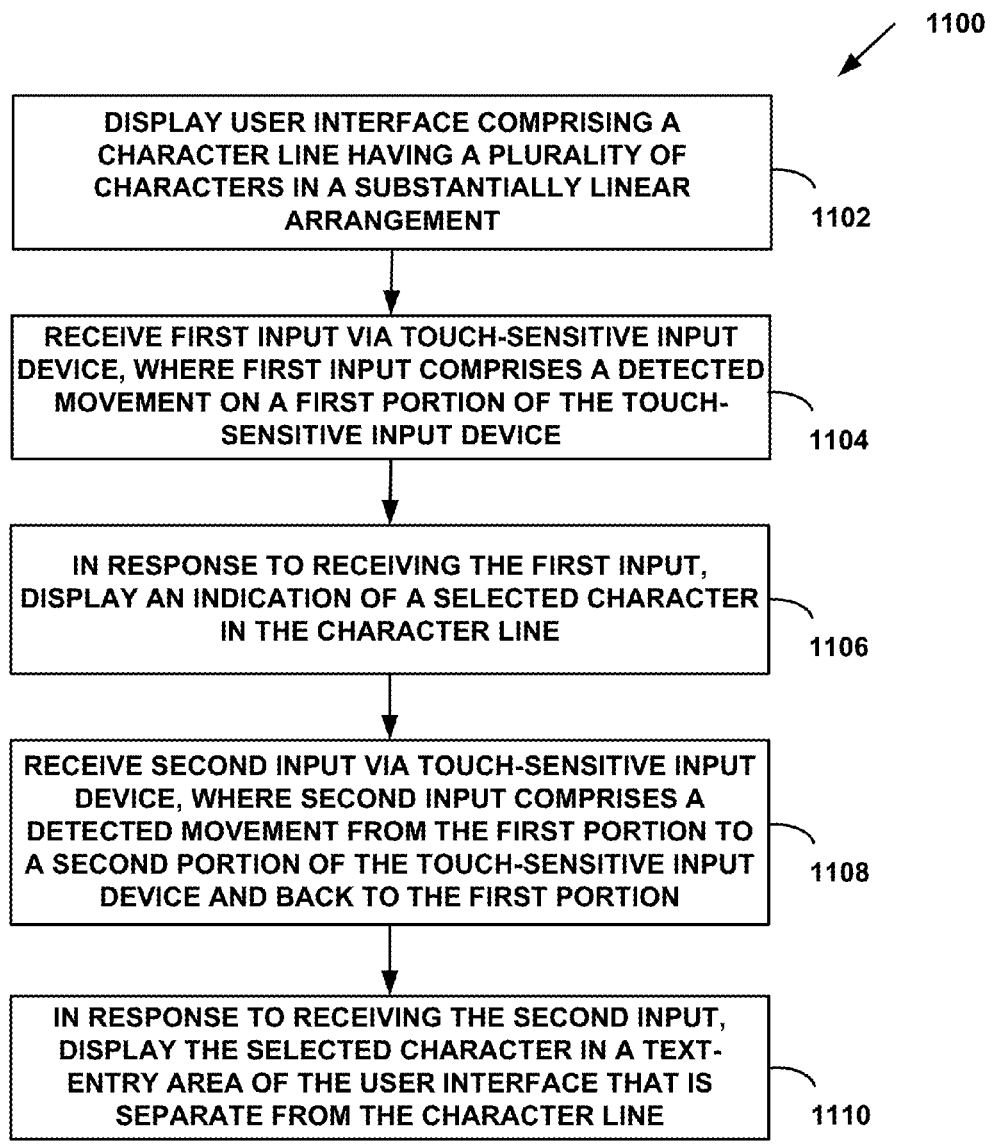
FIG. 11 is a flow-chart illustrating an example method of providing text entry to a wearable heads-up display device, according to an example embodiment.

In addition to the text-entry methods described above, another exemplary method may involve a scratch-to-select text-entry technique. In particular, a user may use a scratch-to-select text-entry technique, rather than a lift-to-select text-entry technique, in order to enter a selected character. FIG. 11 is a flow chart illustrating a method according to an example embodiment of a scratch-to-select text-entry technique.

More specifically, example method 1100 involves displaying a user interface comprising a character line, the character line including a plurality of characters in a substantially linear arrangement, as shown by block 1102. The method may then involve receiving a first input via a touch-sensitive input device, wherein the first input comprises a detected movement on a first portion of the touch-sensitive input device, as shown by block 1104. Further, the method may then involve, in response to receiving the first input, displaying an indication of a selected character in the character line, as shown by block 1106. The method may then involve receiving a second input via the touch-sensitive input device, wherein the second input comprises a detected movement from the first portion to a second portion of the touch-sensitive input device and back to the first portion, as shown by block 1108. The method may then involve in response to receiving the second input, displaying the selected character in a text-entry area of the user interface that is separate from the character line, as shown by block 1110. Exemplary method 1100 is described by way of example as being carried out by a wearable computing system, such as wearable computing system 200.

A. Displaying a User Interface Comprising a Character Line

As mentioned above, at block 1102 the wearable computing system may display a user interface comprising a character line, the character line comprising a plurality of characters in a substantially linear arrangement. For example, as described above with reference to FIGS. 6a-6i and 7a-7b, the wearable computing system may display a user interface such as user interface 500. As described above, user interface 500 may include a character line that comprises a plurality of characters in a substantially linear arrangement, such as character line 507 or character line 707. Further, as described above, the character line may be part of a rotary wheel comprising a plurality of character lines, and thus the wearable computing system may display a user-selected character line from the plurality of character lines of the rotary wheel.

B. Receiving a First Input Via a Touch-Sensitive Input Device

As described above, a wearable computing system may include a linear touch-sensitive input device that a user can engage (e.g., with a finger) in order to enter text. The user may begin to select a character from the character line by interacting with the linear touch-sensitive input device. In particular, at block 1104 the wearable computing system may receive a first input via a touch-sensitive input device, where the first input comprises a detected movement on a first portion of the touch-sensitive input device.

To facilitate a scratch-to-select text-entry technique, the linear touch-sensitive input device may include both a first portion and a second portion. In an exemplary embodiment, these first and second portions may serve different functions in the scratch-to-select text-entry process. In particular, the first portion may be used by a user to locate a desired character within the character line to select. Further, the second portion may be used by a user to facilitate text-entry of the desired character. As will be described below, a user may enter the text by making a movement (e.g., with the user's finger) from the first portion to the second portion and back to the first portion. This type of movement is similar to a scratch-type movement, and thus this type of text-entry technique is referred to herein as a "scratch-to-select" text-entry technique.

Figure 12:
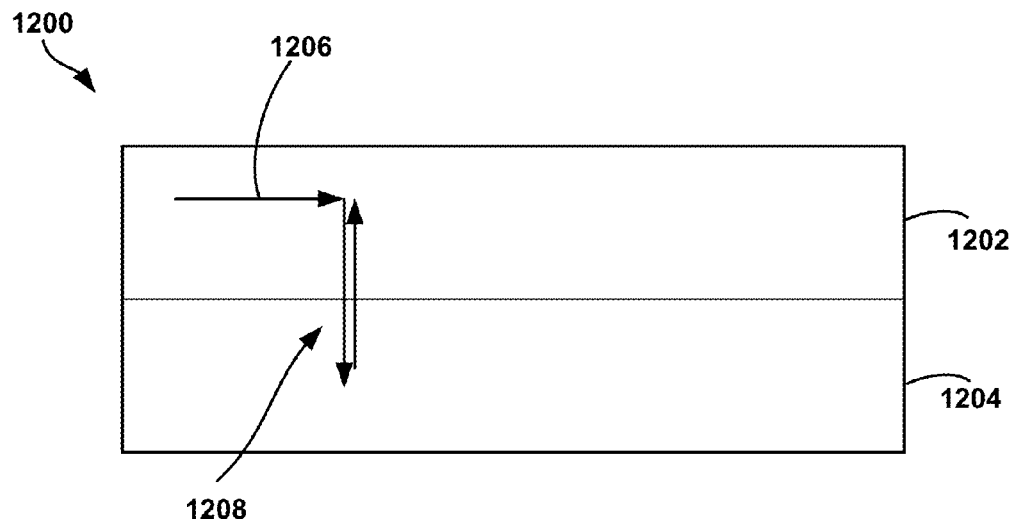
FIG. 12 is an illustration of an example touch-sensitive input device, according to an example embodiment.

FIG. 12 depicts an example touch-sensitive input device 1200 that is configured for entering text in accordance with a scratch-to-select text-entry technique. Touch-sensitive input device 1200 includes a first portion 1202 and a second portion 1204. In an example, the touch-sensitive input device 1200 may be formed to have a raised, indented, or roughened surface between the first portion 1202 and the second portion 1204, so as to provide tactile feedback to a user when the user's finger reaches the respective portions of the touch-sensitive input device 1200.

In order to locate a desired character within the character line, a user may engage with the first portion 1202 (e.g., by moving the user's finger horizontally along the first portion 1202). As described above, the input space of the touch-sensitive input device may be mapped to the horizontal list of characters in the character line. For instance, each character in the character line may be associated with a given amount of space. For example, if the character line includes 26 characters, each character may be associated with $1/26^{th}$ of the horizontal input space of the first portion 1202 of the touch-sensitive input device 1200.

In the example of FIG. 12, the first portion 1202 corresponds to a top half of the touch-sensitive input device 1200, and the second portion 1204 corresponds to a bottom half of the touch-sensitive input device 1200. However, in other examples, the first and second portions may be arranged in different proportions. For example, the first portion may correspond to the top ¾ of the touch-sensitive input device, and the second portion may correspond to the bottom ¼ of the touch-sensitive input device. As another example, the first portion may correspond to the top 60%, and the bottom portion may correspond to the bottom 40%. Other example proportions are possible as well. Further, in the example of FIG. 12, the first portion is located above the second portion. However, in another example, the first portion may be located below the second portion.

Still further, the touch-sensitive input device may be various shapes. In an example, the touch-sensitive input device is substantially rectangular. Similarly, the first and second portions of the touch-sensitive input device may also be substantially rectangular, as illustrated in FIG. 12. Example substantially rectangular touch-sensitive input devices are shown in FIGS. 4a, 4d, and 12-13. However, it should be understood that other touch-sensitive input device shapes are possible as well. For example, in another embodiment, the touch-sensitive input device may be square, such as input device 440 shown in FIG. 4d. Yet still further, the touch-sensitive input device may be various sizes. In an example, the linear touch-sensitive input device is a 60×10 millimeter (mm) touch-sensitive input device. However, other sizes are possible as well.

C. In Response to Receiving the First Input, Displaying an Indication of a Selected Character At block 1106 the wearable computing system may, in response to receiving the first input, display an indication of a selected character in the character line. As mentioned above, the input space of the first portion 1202 of the touch-sensitive input device 1200 may be mapped to the horizontal list of characters in the character line. For example, if the character line includes 26 characters, each character may be associated with $1/26^{th}$ of the horizontal input space of the first portion 1202 of the touch-sensitive input device 1200. For instance, with respect to FIG. 6a, each character A-Z in character line 507 may be associated with $1/26^{th}$ of the horizontal input space of the first portion 1202 of the touch-sensitive input device 1200. In this example, the first $1/26^{th}$ of first portion 1202 may be associated with "A", the second $1/26^{th}$ of first portion 1202 may be associated with "B", and so forth.

An example path 1206 of an example first-input movement is shown in FIG. 12. In this example, the user is moving their finger horizontally across the first portion 1202. With reference to FIG. 6a, in response to receiving the first input along path 1206 on the first portion 1202, the wearable computing system may display an indication 508 of a selected character in the character line 507. Thus, if the user is interacting with the first $\frac{1}{26}^{th}$ of the first portion 1202, the selected character will be "A", and the wearable computing system may display an indication that "A" is the selected character. The user may continue to move horizontally along the first portion 1202 until the user has identified the character that they would like to enter. For instance, the user may wish to select "G," so the user may move their finger to the part of first portion 1202 that corresponds to "G" (i.e., the seventh $\frac{1}{26}^{th}$ of the first portion 1202). The wearable computing system may then display an indication that "G" is the selected character, as shown in FIG. 6a.

As mentioned above, any number of visual indicators may be provided to display an indication 508 of a selected character in the character line 507, such as a shaded selection, a color change (e.g., highlighting), a brightness change, a size change, a position offset (e.g., displaying the selected character as raised above other characters in the character line), and a background change, among others.

D. Receiving a Second Input Via the Touch-Sensitive Input Device

After a user identifies a character that the user would like to enter into the text-entry box, the user may perform a scratch-type motion to enter the character. In particular, as mentioned above, at block 1108 the wearable computing system may receive a second input via the touch-sensitive input device, where the second input comprises a detected movement from the first portion to a second portion of the touch-sensitive input device and back to the first portion. In particular, the wearable computing system may detect a movement from the first portion 1202 to the second portion 1204 and back to the first portion 1202. An example path 1208 of such a second-input movement is shown in FIG. 12. In particular, the movement path 1208 is a vertical movement from the first portion 1202 to the second portion 1204 and back to the first portion 1202. During this movement, the user does not need to lift the user's finger off the surface of the touch-sensitive input device.

E. In Response to Receiving the Second Input, Displaying the Selected Character in a Text-Entry Area At block 1110 the wearable computing system may, in response to receiving the second input, display the selected character in a text-entry area of the user interface that is separate from the character line. As mentioned above, when the user is over the character that the user wishes to select, the user can drag the user's finger down to the second portion 1204. When the user reaches or crosses onto the second portion 1204, the wearable computing system may treat the character as the selected character. In order to enter the selected character and proceed with selecting a next character, the user may then slide their finger back to the first portion 1202.

For example, with reference to FIG. 6a, after detecting a scratch movement from the first portion 1202 to the second portion 1204 and back to the first portion 1202, the system may display the selected character "G" in a text-entry area of the user interface (such as text box 502) that is separate from the character line 507.

In an example, if the user has moved the user's finger onto the second portion 1204, but thereafter decides that the user does not wish to enter the selected character, the user may stop from proceeding to slide the user's finger to the first portion. For example, in such a situation, in order to stop entry of the selected character, the user may remove the finger from the touch-sensitive input device (e.g., lift off), and then begin the text-entry process over.

Beneficially, by using a scratch-to-select text-entry technique as described above, the user can be aware of the user's finger location on the touch-sensitive input device after entering a character. As a result, the user may know which direction to move toward in order to enter the next desired character. This scratch-to-select text-entry technique has example advantages over a lift-to-select text-entry technique in which a user lifts the finger off of the touch-sensitive input device to select a character. For example, in a lift-to-select text-entry technique, after lifting the finger off the touch-sensitive input device to select the character, the user would need to touch the touch-sensitive input device again in order to begin selecting the next character. However, due to the size of the touch-sensitive input device, the user will often not touch back down on the same character that the user has just selected. Thus, after landing on the touch-sensitive input device again, the user will have to figure out where the user's finger is on the touch-sensitive input device, and then decide which way to navigate in order to select the next character. This process of figuring out where the user is and which direction to navigate can be undesirably time consuming. Beneficially, using the scratch-to-select text-entry technique in accordance with an exemplary embodiment, the user can know the location of the finger after selecting each character. Thus, a scratch-to-select text-entry technique may speed up a text-entry process for a wearable computing system.

Figure 13:
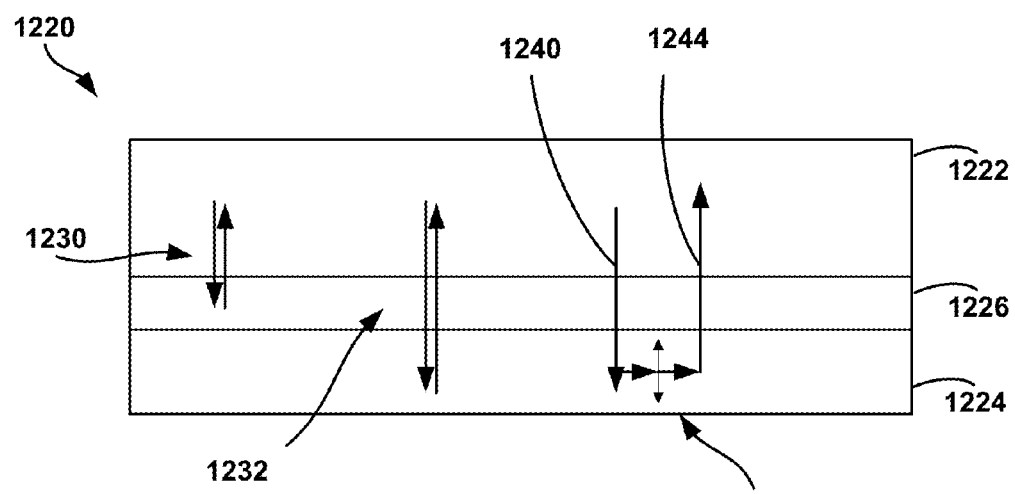
FIG. 13 is an illustration of another example touch-sensitive input device, according to an example embodiment.

F. Detecting Movement on a Third Portion Located Between the First and Second Portions In an example, the touch-sensitive input device may further include a third portion located between the first portion and the second portion. For instance, FIG. 13 illustrates an example touch-sensitive input device 1220, which has a first portion 1222, second portion 1224, and a third portion 1226. Third portion 1226 is located between the first and second portions. In an example, the touch-sensitive input device may be formed to have a raised, indented, or roughened surface between the first and third portions and between the third and second portions, so as to provide tactile feedback to a user.

Touch-sensitive input device 1220 may operate in a similar fashion as touch-sensitive input device 1200, and thus is not described in as great of detail. However, touch-sensitive input device 1220 further includes the third portion 1226, which may serve to indicate to the user that the user is about to enter a selected character from the character line.

In an example, the wearable computing system may detect movement on the third portion 1226. Responsive to detecting movement on the third portion 1226, the wearable computing system may display an indication that the selected character is about to be displayed in the text-entry area. Displaying the indication that the selected character is about to be displayed in the text-entry area may comprise displaying the selected character as being depressed below other characters in the character line. Visually, this may appear similar to depressing a key on a keyboard. Of course, other visual indicators are possible as well.

FIG. 13 depicts example movement paths 1230 and 1232. Movement path 1230 includes a movement from the first portion 1220 to the third portion 1226. Responsive to this detected movement, the wearable computing system may display an indication that the selected character is about to be displayed in the text-entry area. However, after seeing that the selected character is about to be displayed in the text-entry area, the user may decide that the user does not actually wish to enter the selected text. Thus, prior to the user completing the text-entry by moving to the second portion 1224, the user may instead return to the first portion 1222 without having interacted with the second portion 1224. The user may then continue looking for a character to enter by moving horizontally along the first portion 1220.

On the other hand, movement path 1232 includes a movement from the first portion 1220 to the third portion 1226 to the second portion 1224, and then back to the first portion 1222. Once again, responsive to detecting movement in the third portion 1226, the wearable computing system may display an indication that the selected character is about to be displayed in the text-entry area. The user may then continue to enter the selected character by moving along movement path 1232 in order to complete entry of the selected character.

The first portion 1222, second portion 1224, and third portion 1226 of the touch-sensitive input device may occupy various proportions of the touch-sensitive input device 1220. In an example, the first portion is located in a top half of the touch-sensitive input device, and the second and third portions are located in a bottom half of the touch-sensitive input device. However, other proportions are possible as well. For example, each portion may occupy a third of the input space of the touch-sensitive input device.

G. Word-Completion Suggestion

In accordance with an exemplary embodiment, the wearable computing system may further be configured to display a word-completion suggestion. In an example, the wearable computing system may display a word-completion suggestion responsive to detecting movement in the second portion. The wearable computing system may display the word-completion suggestion in the user interface. From the displayed word-completion suggestions, the user may select an appropriate word-completion suggestion. In order to do so, the user may provide an input via the touch-sensitive input device. In an example, the wearable computing system may receive a third input via the touch-sensitive input device, where the third input comprises a detected movement in a defined direction on the second portion of the touch-sensitive input device. The defined direction may, for example, comprise movement to the left or right and/or movement up and down in order to select an appropriate word-completion suggestion from the displayed suggestions. After a user selects a word-completion suggestion, the user may enter the word-completion suggestion by returning to the first portion 1222. The wearable computing system may then display the selected character along with the word-completion suggestion in the text-entry area.

Figure 14:
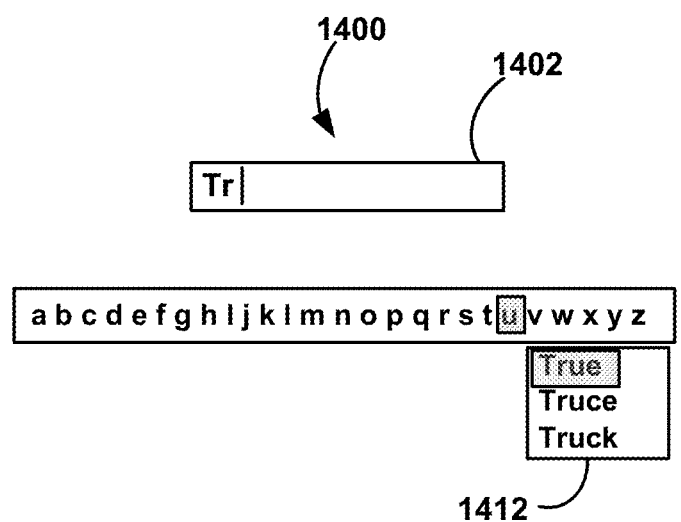
FIG. 14 is an illustration of an example display of a word-completion suggestion, according to an example embodiment.

An example word-completion suggestion process is described with reference to FIGS. 13 and 14. In particular, an example movement pattern for entering a word-completion suggestion is shown in FIG. 13, and an example word-completion display 1300 is shown in FIG. 14. In the example of FIGS. 13 and 14, the user had already entered the characters "T" and "r." Further, the currently selected character may be "u." The user may initiate selecting the character "u" by moving along movement path 1240. When a user reaches the second portion 1224, the system may display at least one word-completion suggestion. In this example, the system displays word-completion suggestions 1412.

If one of the word-completion suggestions is acceptable to the user, the user may perform a movement in a defined direction to select the acceptable word-completion suggestion. In an example, the user may do so by following movement path 1242. Movement path 1242 includes a movement to the right, followed by an up and down movement. The movement to the right may indicate that the user would like to select a word-completion suggestion from the word-completion suggestions 1412. A user may then scroll through the word-completion suggestions by moving up and down.

In the example of FIG. 14, the currently selected word-completion selection is "True." If the user would like to change the currently selected word-completion selection, the user could move up and down to scroll through the word-completion suggestions 1412. After the user has selected the desired word-completion suggestion, the user may move back up to the first portion 1222, and the system may responsively enter the word-completion selection in the text-entry area. For example, after selecting a word-completion suggestion, the user may then move to the right and then along movement path 1244 (i.e., back to the first portion 1222). The system may then display the selected character along with the word-completion suggestion in the text-entry area 1402.

It should be understood that the movement path for word-completion suggestion shown in FIG. 13 is intended as an example only. Other movement paths for selecting a word-completion suggestion are possible as well.

4. Example Hardware for a Computing Device

Figure 9:
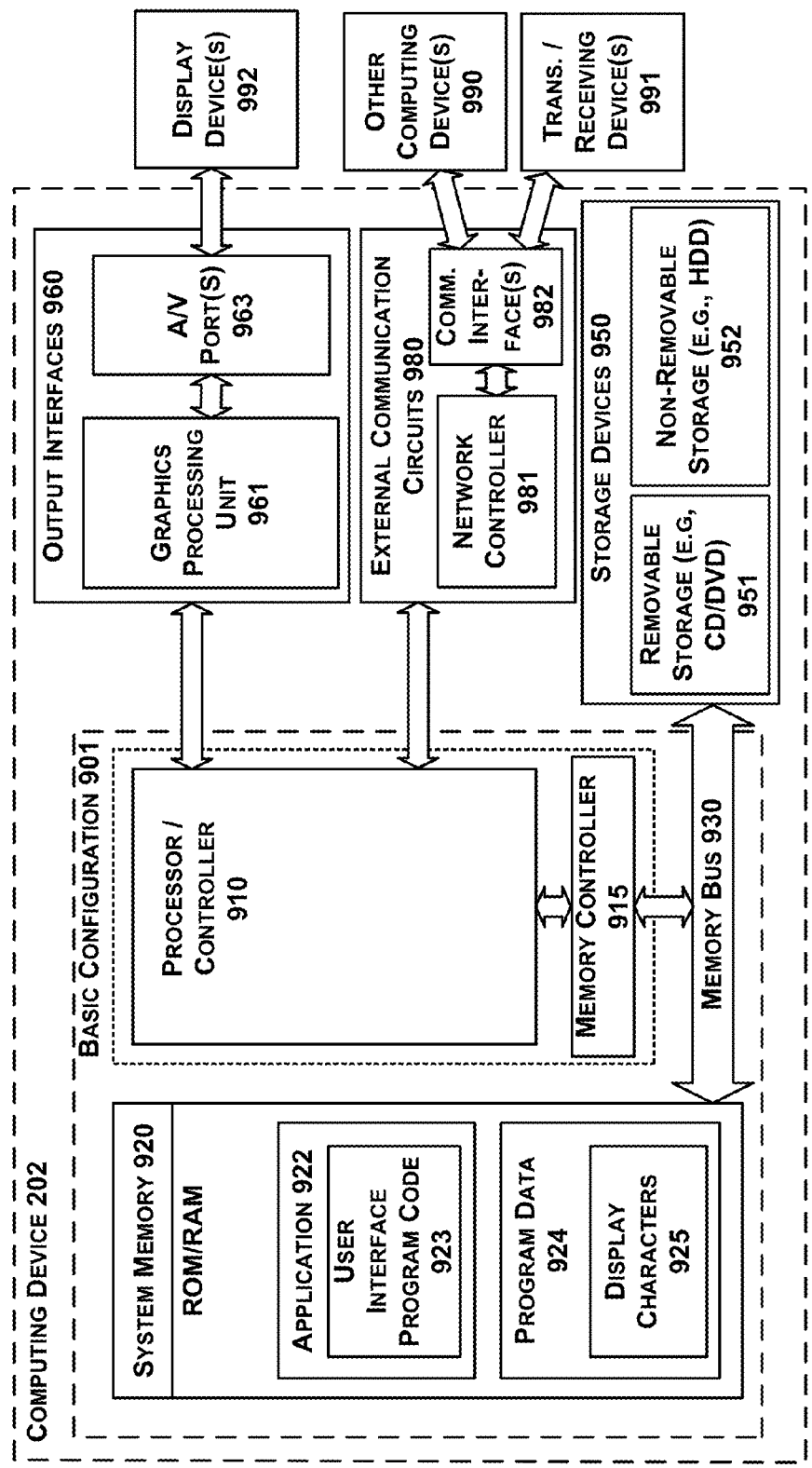
FIG. 9 is a functional block diagram of a computing device for supporting the wearable heads-up display device system of FIG. 2.

FIG. 9 is a functional block diagram of a computing device 202 on which the rotary wheel user interface may be provided. The computing device 202 may be a wearable heads-up display set forth above arranged in accordance with at least some embodiments described herein, a personal computer, a mobile device, a mobile phone, a video game system, a global positioning system, or some other electronic system. In a basic configuration 901, computing device 202 may include one or more processors and/or controllers shown in FIG. 9 as processor/controller 910, and system memory 920. A memory bus 930 can be used for communicating between the processor/controller 910 and the system memory 920. Depending on the desired configuration, processor/controller 910 can be of any type including, but not limited to, a microprocessor (µP), a microcontroller (µC), a digital signal processor (DSP), or any combination thereof. A memory controller 915 can also be used with the processor/controller 910, or in some implementations, the memory controller 915 can be an internal part of the processor/controller 910.

Depending on the desired configuration, the system memory 920 can be of any type including but not limited to volatile memory (such as RAM), non-volatile memory (such as ROM, flash memory, etc.) or any combination thereof. System memory 920 typically includes one or more applications 922 and program data 924. Application 922 may include program code such as user interface program code 923 arranged to be operable via one or more input devices such as planar direction input devices, in accordance with the present disclosure. Other process descriptions, steps, or blocks in flow or message diagrams in the present disclosure should be understood as potentially representing modules, segments, or portions of code which include one or more executable instructions stored in application memory 922 for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Program data 924 may include, among other things, display characters 925 that correspond to characters displayed in one or more character lines of the user interface implemented via user interface program code 923, and that may be included in display data sent to one or more display devices 992. Accordingly, in some example embodiments, applications stored in application memory 922 can be arranged to operate with program data 924. Computing device 202 can have additional features or functionality, and additional interfaces to facilitate communications between the basic configuration 901 and any devices and interfaces. For example, computing device 202 may include data storage devices 950 that can communicate with basic configuration 901 using memory bus 930. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few.

Computer storage media can include volatile and nonvolatile, removable and non-removable media implemented in any method or technology for storage of information, such as computer readable instructions, data structures, program modules, or other data.

System memory 920, removable storage media for use with removable storage devices 951, and non-removable storage 952 are all examples of computer storage media. Computer storage media includes, but is not limited to, RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by computing device 202.

Computing device 202 can also include output interfaces 960 that may include a graphics processing unit 961, which can be configured to communicate to various external devices such as display devices 992 (which may include, for example, projecting devices 302, 306 and/or lenses 108, 110) or speakers via one or more A/V ports 963. External communication circuits 980 may include a network controller 981, which can be arranged to facilitate communications with one or more other computing devices 990 and/or one or more transmitting and/or receiving devices 991. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media. The term tangible computer readable media may refer to storage media alone.

Computing device 202 can be implemented as a portion of a small-form factor portable (or mobile) electronic device such as a mobile phone, a multi-chip module (MCM), an application-specific integrated circuit (ASIC), a field-programmable gate array (FPGA), a PDA, a personal media player device, a wireless web-watch device, a personal headset device, a heads-up display, an application specific device, or a hybrid device that includes any of the above functions. Computing device 202 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 10:
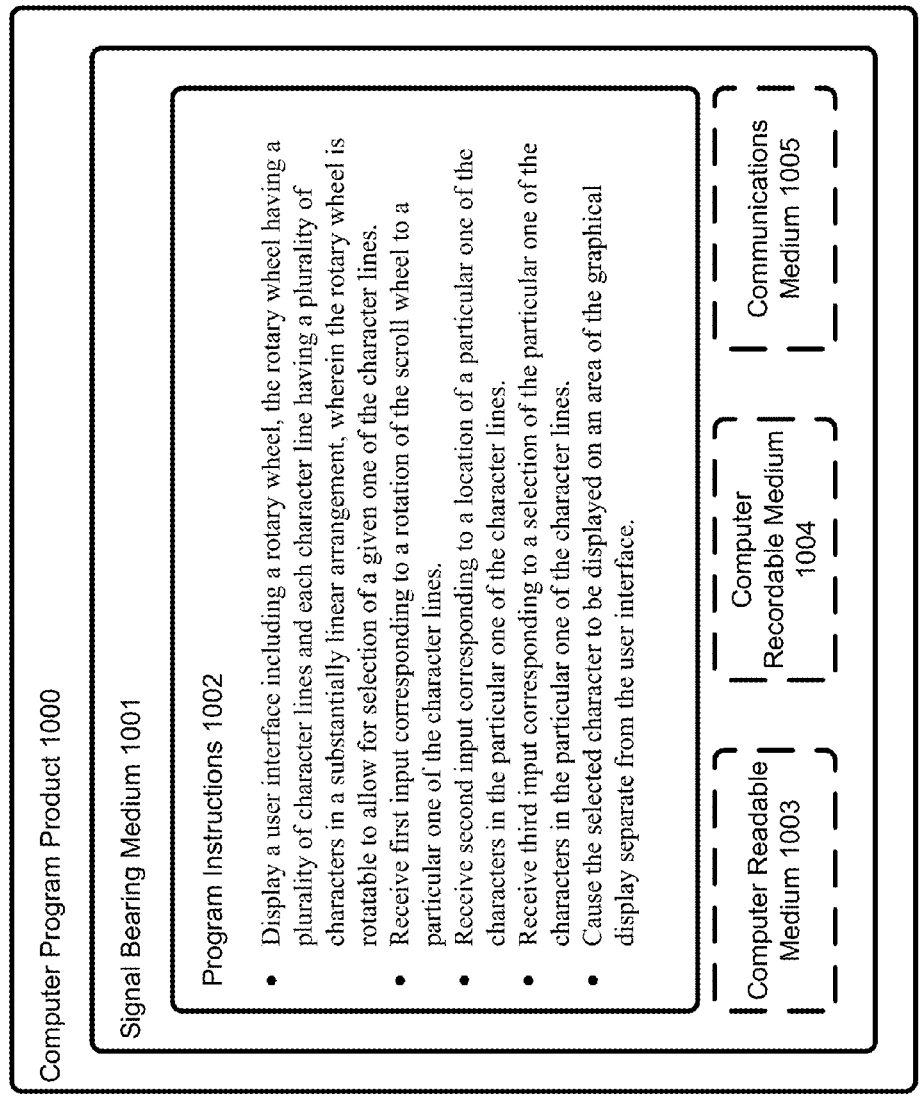
FIG. 10 is a schematic illustrating a conceptual partial view of an example computer program product.

In some embodiments, the disclosed methods may be implemented as computer program instructions encoded on a computer-readable storage media or tangible computer-readable storage media in a machine-readable format. FIG. 10 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by one or more processors, may provide functionality or portions of the functionality described above with respect to FIGS. 5-8. Thus, for example, referring to the embodiment shown in FIG. 8, one or more features of method 800 may be undertaken by one or more instructions associated with the signal bearing medium 1001.

In some examples, the signal bearing medium 1001 may encompass a tangible, non-transitory computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming with the IEEE 802.11 standard or other transmission protocol).

The one or more programming instructions 1002 may be, for example, computer executable and/or logic implemented instructions. In some examples, a computing device such as the computing device 202 of FIG. 9 may be configured to provide various operations, functions, or actions in response to the programming instructions 1002 conveyed to the computing device 202 by one or more of the computer readable medium 1003, the computer recordable medium 1004, and/or the communications medium 1005.

Figure 15:
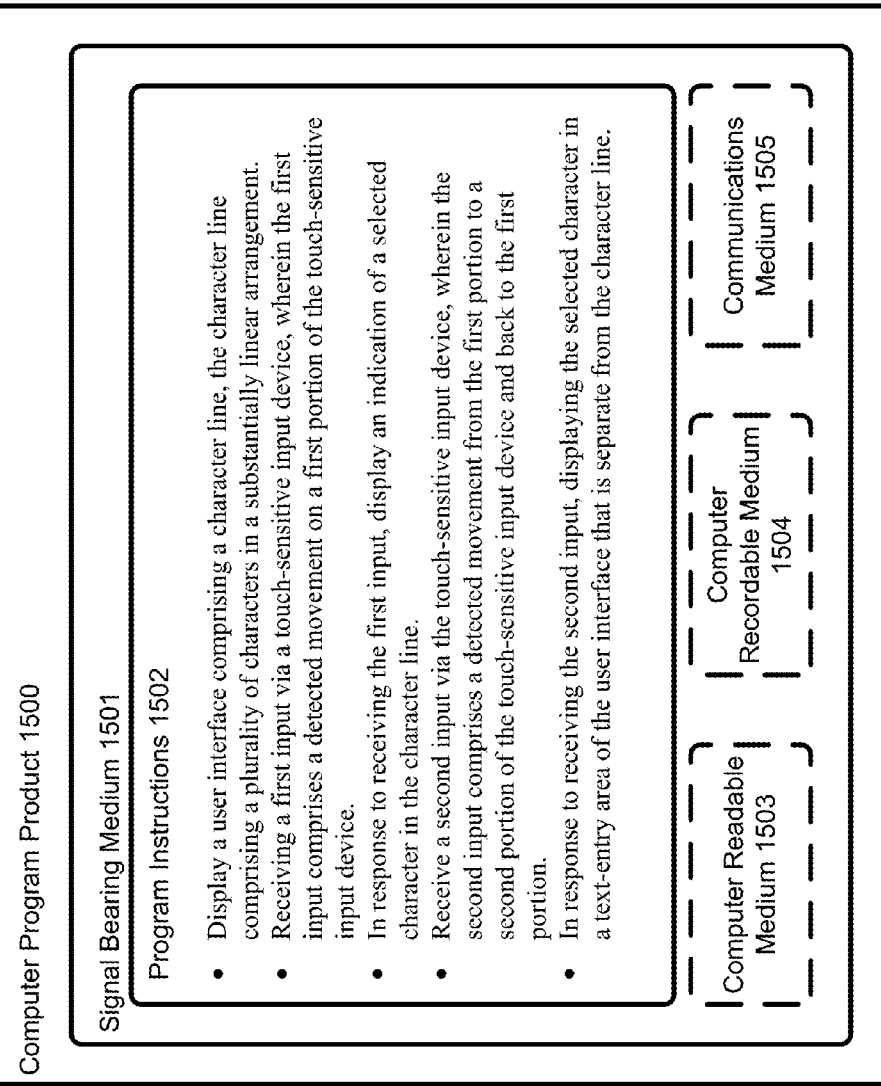
FIG. 15 is a schematic illustrating a conceptual partial view of an example computer program product.

FIG. 15 is a schematic illustrating a conceptual partial view of an example computer program product 1500 that includes a computer program for executing a computer process on a computing device, arranged according to at least some embodiments presented herein. In one embodiment, the example computer program product 1500 is provided using a signal bearing medium 1501. The signal bearing medium 1501 may include one or more programming instructions 1502 that, when executed by one or more processors, may provide functionality or portions of the functionality described above with respect to FIGS. 11-14. Thus, for example, referring to the embodiment shown in FIG. 11, one or more features of method 1100 may be undertaken by one or more instructions associated with the signal bearing medium 1501.

In some examples, the signal bearing medium 1501 may encompass a tangible, non-transitory computer-readable medium 1503, such as, but not limited to, a hard disk drive, a Compact Disc (CD), a Digital Video Disk (DVD), a digital tape, memory, etc. In some implementations, the signal bearing medium 1501 may encompass a computer recordable medium 1504, such as, but not limited to, memory, read/write (R/W) CDs, R/W DVDs, etc. In some implementations, the signal bearing medium 1501 may encompass a communications medium 1505, such as, but not limited to, a digital and/or an analog communication medium (e.g., a fiber optic cable, a waveguide, a wired communications link, a wireless communication link, etc.). Thus, for example, the signal bearing medium 1501 may be conveyed by a wireless form of the communications medium 1505 (e.g., a wireless communications medium conforming with the IEEE 802.11 standard or other transmission protocol).

The one or more programming instructions 1502 may be, for example, computer executable and/or logic implemented instructions. In some examples, a computing device such as the computing device 202 of FIG. 9 may be configured to provide various operations, functions, or actions in response to the programming instructions 1502 conveyed to the computing device 202 by one or more of the computer readable medium 1503, the computer recordable medium 1504, and/or the communications medium 1505.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
    displaying a user interface comprising a character line, the character line comprising a plurality of characters in a substantially linear arrangement;
    receiving a first input via a touch-sensitive input device, wherein the first input comprises a detected movement on a first portion of the touch-sensitive input device;
    in response to receiving the first input, displaying an indication of a selected character in the character line;
    receiving a second input via the touch-sensitive input device, wherein the second input comprises a detected movement from the first portion to a second portion of the touch-sensitive input device and back to the first portion; and
    in response to receiving the second input, displaying the selected character in a text-entry area of the user interface that is separate from the character line.

2. The method of claim 1, wherein the touch-sensitive input device is substantially rectangular, wherein the first and second portions are substantially rectangular, and wherein the first portion is located above the second portion.

3. The method of claim 2, wherein the first portion corresponds to a top half of the touch-sensitive input device, and wherein the second portion corresponds to a bottom half of the touch-sensitive input device.

4. The method of claim 1, wherein the touch-sensitive input device further comprises a third portion, wherein the third portion is located between the first portion and the second portion, the method further comprising:
    detecting movement on the third portion; and
    responsive to detecting movement on the third portion, displaying an indication that the selected character is about to be displayed in the text-entry area.

5. The method of claim 4, wherein displaying the indication that the selected character is about to be displayed in the text-entry area comprises displaying the selected character as being depressed below other characters in the character line.

6. The method of claim 4, wherein the touch-sensitive input device is substantially rectangular, wherein the first portion is located in a top half of the touch-sensitive input device, and wherein the second and third portions are located in a bottom half of the touch-sensitive input device.

7. The method of claim 1, further comprising:
    responsive to detecting movement in the second portion, displaying in the user interface a word-completion suggestion;
    receiving a third input via the touch-sensitive input device, wherein the third input comprises a detected movement in a defined direction on the second portion of the touch-sensitive input device; and
    displaying the selected character along with the word-completion suggestion in the text-entry area.

8. The method of claim 1, wherein the touch-sensitive input device is a touch-screen device that displays the user interface.

9. The method of claim 1, wherein the touch-sensitive input device is disposed on a side of a wearable heads-up display.

10. The method of claim 9, wherein the user interface is displayed on a display in the wearable heads-up display.

11. The method of claim 9, wherein the wearable heads-up display is configured as eyeglasses, and the touch-sensitive input device is disposed on a side of a stem of the eyeglasses.

12. The method of claim 1, wherein displaying an indication of the selected character comprises at least one of highlighting the selected character and displaying the selected character as raised above other characters in the character line.

13. A non-transitory computer readable medium having instructions stored thereon that, in response to execution by a processor, cause the processor to perform operations, the instructions comprising:
    instructions for displaying a user interface comprising a character line, the character line comprising a plurality of characters in a substantially linear arrangement;
    instructions for receiving a first input via a touch-sensitive input device, wherein the first input comprises a detected movement on a first portion of the touch-sensitive input device;
    instructions for, in response to receiving the first input, displaying an indication of a selected character in the character line;
    instructions for receiving a second input via the touch-sensitive input device, wherein the second input comprises a detected movement from the first portion to a second portion of the touch-sensitive input device and back to the first portion; and instructions for, in response to receiving the second input, displaying the selected character in a text-entry area of the user interface that is separate from the character line.

14. The non-transitory computer readable medium of claim 13, wherein the instructions further comprise:
   instructions for detecting movement on a third portion of the touch-sensitive input device, wherein the third portion is located between the first portion and the second portion; and
   instructions for, responsive to detecting movement on the third portion, displaying an indication that the selected character is about to be displayed in the text-entry area.

15. The non-transitory computer readable medium of claim 13, wherein the touch-sensitive input device is substantially rectangular, wherein the first portion is located in a top half of the touch-sensitive input device, and wherein the second and third portions are located in a bottom half of the touch-sensitive input device.

16. A wearable computing system comprising:
   a head-mounted display, wherein the head-mounted display is configured to provide a view of a real-world environment of the wearable computing system, wherein providing the view of the real-world environment comprises displaying computer-generated information and allowing visual perception of the real-world environment;
   a display system, wherein the display system is configured to display a user interface comprising a character line, the character line comprising a plurality of characters in a substantially linear arrangement;
   a touch-sensitive input device, wherein the touch-sensitive input device is configured to receive a first input via the touch-sensitive input device, wherein the first input comprises a detected movement on a first portion of the touch-sensitive input device;
   wherein the display system is further configured to, in response to receiving the first input, display an indication of a selected character in the character line;
   wherein the touch-sensitive input device is further configured to receive a second input via the touch-sensitive input device, wherein the second input comprises a detected movement from the first portion to a second portion of the touch-sensitive input device and back to the first portion; and
   wherein the display system is further configured to, in response to receiving the second input, display the selected character in a text-entry area of the user interface that is separate from the character line.

17. The wearable computing system of claim 16, wherein the touch-sensitive input device is substantially rectangular, wherein the first and second portions are substantially rectangular, and wherein the first portion is located above the second portion.

18. The wearable computing system of claim 16, wherein the touch-sensitive input device further comprises a third portion, wherein the third portion is located between the first portion and the second portion, wherein the touch-sensitive input device is further configured to detect movement on the third portion, and wherein the display system is further configured to, responsive to the touch-sensitive input device detecting movement on the third portion, display an indication that the selected character is about to be displayed in the text-entry area.

19. The wearable computing system of claim 18, the touch-sensitive input device is substantially rectangular, wherein the first portion is located in a top half of the touch-sensitive input device, and wherein the second and third portions are located in a bottom half of the touch-sensitive input device.

20. The wearable computing system of claim 16, wherein the touch-sensitive input device is disposed on a side of the head-mounted display.

* * * * *